United States Patent
Choi et al.

(10) Patent No.: US 10,379,731 B2
(45) Date of Patent: Aug. 13, 2019

(54) OPERATION METHOD OF ELECTRONIC DEVICE AND THE ELECTRONIC DEVICE

(71) Applicant: Samsung Electronics Co., Ltd., Suwon-si, Gyeonggi-do (KR)

(72) Inventors: Ha-Young Choi, Yongin-si (KR); Nan-Sook Kim, Yongin-si (KR); Heang-Su Kim, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 15/209,189

(22) Filed: Jul. 13, 2016

(65) Prior Publication Data

US 2017/0017372 A1    Jan. 19, 2017

(30) Foreign Application Priority Data

Jul. 14, 2015    (KR) ........................ 10-2015-0099920

(51) Int. Cl.
| | |
|---|---|
| *G06F 3/0488* | (2013.01) |
| *H04M 1/725* | (2006.01) |
| *G06F 3/0482* | (2013.01) |
| *H04N 21/41* | (2011.01) |
| *H04N 21/422* | (2011.01) |
| *H04N 21/4788* | (2011.01) |

(52) U.S. Cl.
CPC .......... *G06F 3/0488* (2013.01); *G06F 3/0482* (2013.01); *H04M 1/72527* (2013.01);
(Continued)

(58) Field of Classification Search
CPC .......... H04M 1/72527; H04M 1/72522; G06F 3/0488; G06F 3/0482; G06F 3/0412; G06F 3/04817; G06F 3/0484; G06F 3/1454; G06F 3/1423; G06F 2203/04803; G06F 15/16; G06F 3/033; G06F 3/048; G06F 3/04883; H04N 21/42204; H04N 21/42224; H04N 21/4788; H04N 21/4143; H04N 21/4316; H04N 21/4784; H04N 21/47205; H04N 21/44222; H04N 21/23424; H04N 21/4222; H04N 21/4307; H04N 21/47217; H04N 21/482; H04N 21/4227; H04N 21/42209; H04N 21/4122; H04N 21/812;
(Continued)

(56) References Cited

U.S. PATENT DOCUMENTS

| | | | |
|---|---|---|---|
| 7,412,533 B1 * | 8/2008 | Johnson | .............. H04L 12/1827 709/231 |
| 8,660,545 B1 * | 2/2014 | Redford | .................. H04W 4/50 455/418 |

(Continued)

FOREIGN PATENT DOCUMENTS

| | | |
|---|---|---|
| KR | 10-2013-0134393 A | 12/2013 |
| KR | 10-2014-0068651 A | 6/2014 |
| KR | 10-2014-0074799 A | 6/2014 |

*Primary Examiner* — Vinh T Lam
(74) *Attorney, Agent, or Firm* — Jefferson IP Law, LLP

(57) ABSTRACT

A method of operating a first electronic device is provided. The method includes receiving information associated with data or an application for outputting the data from a second electronic device, displaying a graphic element comprising at least a part of the information associated with the data or the application, detecting a user input with respect to the graphic element, and outputting at least a part of the data based on the output information of the data in response to the user input.

13 Claims, 21 Drawing Sheets

(52) U.S. Cl.
CPC ... *H04N 21/4126* (2013.01); *H04N 21/42224* (2013.01); *H04N 21/4788* (2013.01); *H04M 1/72522* (2013.01)

(58) Field of Classification Search
CPC ......... H04N 21/4333; H04N 21/47202; H04N 21/6587; H04N 21/8352; H04N 21/8455; H04N 21/8547; H04N 5/4403; H04N 21/42207; H04N 21/42222; H04N 21/42226; H04N 21/4325; H04N 21/4334; H04N 21/43637; H04N 21/441; H04N 21/4438; H04N 21/4532; H04N 21/4583; H04N 21/4661; H04N 21/4668; H04N 21/47214; H04N 21/4751; H04N 21/4753; H04N 21/4826; H04N 21/4858; H04N 21/4882; H04N 21/4126; H04L 65/00; H04L 12/282; H04L 12/2812; H04L 2012/2849; H04L 2012/2841; H04L 65/1069; H04L 41/22; H04L 67/16; H04H 60/33; H04H 60/46; H04H 60/45; H04W 4/001; G09G 5/12; G09G 2354/00
USPC ............... 715/720, 769; 710/10; 725/81, 39; 348/564, 734, 2.2; 709/203; 455/418, 455/552, 414.1, 556.1
See application file for complete search history.

(56) References Cited

U.S. PATENT DOCUMENTS

| | | | | |
|---|---|---|---|---|
| 8,934,758 B2* | 1/2015 | Meijer | ................... | H04N 5/445 386/248 |
| 8,958,018 B2* | 2/2015 | Sibilsky | ................... | G06F 3/033 345/2.3 |
| 8,966,520 B2* | 2/2015 | Tom | ................... | G06Q 30/0241 725/32 |
| 9,509,793 B2* | 11/2016 | Brown | ................... | H04L 67/28 |
| 9,699,489 B2* | 7/2017 | Iwamura | ................ | H04L 12/2803 |
| 2012/0290653 A1 | 11/2012 | Sharkey | | |
| 2012/0303834 A1* | 11/2012 | Adam | ................. | H04L 65/4084 709/231 |
| 2013/0138728 A1* | 5/2013 | Kim | ........................ | G06F 15/16 709/203 |
| 2013/0205206 A1* | 8/2013 | Hawver | ................ | G06F 9/485 715/704 |
| 2014/0028918 A1* | 1/2014 | Kim | ..................... | H04N 5/4403 348/564 |
| 2014/0089992 A1* | 3/2014 | Varoglu | ............ | H04N 21/4122 725/81 |
| 2014/0149348 A1 | 5/2014 | Choi et al. | | |
| 2014/0282713 A1* | 9/2014 | Le Pelerin | ......... | H04N 21/4405 725/34 |
| 2014/0337903 A1* | 11/2014 | Zhu | .................... | H04N 21/6587 725/90 |
| 2015/0020013 A1 | 1/2015 | Kim et al. | | |
| 2015/0058728 A1* | 2/2015 | Haggerty | ............... | G06Q 30/02 715/716 |
| 2015/0128046 A1* | 5/2015 | Cormican | .......... | H04N 21/4143 715/720 |
| 2016/0188286 A1* | 6/2016 | Greene | ................... | G11B 27/00 715/716 |
| 2016/0191975 A1* | 6/2016 | Ju | ....................... | H04N 21/2743 725/1 |
| 2017/0374425 A1* | 12/2017 | Disley | ................. | G06F 3/04842 |
| 2018/0139287 A1* | 5/2018 | Hanes | ................. | H04L 12/4625 |
| 2018/0234724 A1* | 8/2018 | Strom | ................ | H04N 21/4325 |

* cited by examiner

OPERATION METHOD OF ELECTRONIC DEVICE AND THE ELECTRONIC DEVICE

CROSS-REFERENCE TO RELATED APPLICATION(S)

This application claims the benefit under 35 U.S.C. § 119(a) of a Korean patent application filed on Jul. 14, 2015 in the Korean Intellectual Property Office and assigned Serial No. 10-2015-0099920, the entire disclosure of which is hereby incorporated by reference.

TECHNICAL FIELD

The present disclosure relates to an electronic device and an operation method thereof.

BACKGROUND

Generally, a cellular phone may output a moving image such as broadcasting or the like displayed on a screen thereof to an external device. A user may view image data downloaded from a web server or captured using a camera on a large-size screen of the external device by outputting the image data to the external device.

A cellular phone having a mirroring function may output a screen thereof to an external device. The user may view a screen (i.e., a mirroring screen) of the cellular phone on the screen of the external device and remotely control the cellular phone by an input operation with respect to the mirroring screen using an input device of the external device.

Although allowing the screen of the cellular phone to be displayed on the external device or allowing the user to remotely control the cellular phone, a mirroring method of the related art fails to provide a method for easily delivering a task that is in progress on an electronic device to another electronic device.

A task delivery method of the related art causes the inconvenience of having to manually moving data or to share a separate storage space between electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for easily delivering a task being in progress on an electronic device to another electronic device.

In accordance with an aspect of the present disclosure, an operation method of a first electronic device is provided. The operation method includes receiving information associated with data or an application for outputting the data from a second electronic device, displaying a graphic element including at least a part of the information associated with the data or the application for outputting the data, detecting a user input with respect to the graphic element, and outputting at least a part of the data based on output information of the data in response to the user input.

In accordance with another aspect of the present disclosure, a first electronic device is provided. The electronic device includes an output device and a processor configured to receive information associated with data or an application for outputting the data from a second electronic device, to display a graphic element including at least a part of the information associated with the data or the application on the output device, to detect a user input with respect to the graphic element, and to output at least a part of the data through the output device based on the output information of the data in response to the user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
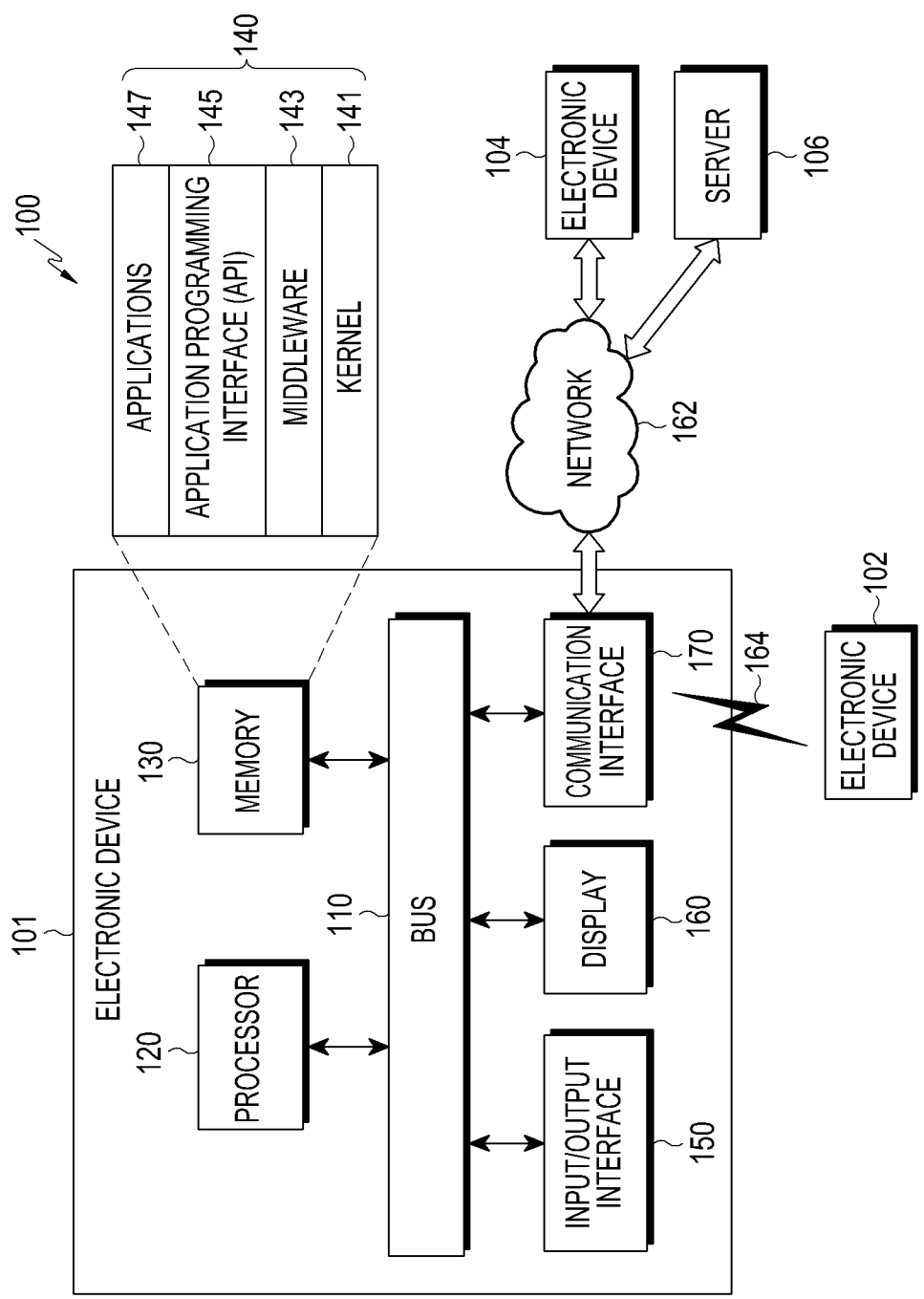
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," "A/B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor (AP) that can perform a corresponding operation by executing at least one software program stored at a memory device.

Terms defined in the present disclosure are used for only describing a specific embodiment and may not have an intention to limit the scope of other various embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various embodiments.

An electronic device according to various embodiments of the present disclosure may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and/or the like.

According to some embodiments, the electronic device may be a smart home appliance. The electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

The electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), internet of things (e.g., electric bulbs, various sensors, electricity or gas meters, sprinkler devices, fire alarm devices, thermostats, streetlights, toasters, exercise machines, hot-water tanks, heaters, boilers, and/or the like).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

FIG. 1 illustrates an electronic device in a network environment according to an embodiment of the present disclosure.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 120, 130, and 150 to 170 and delivering communication (e.g., a control message and/or data) between the elements 120, 130, and 150 to 170.

The processor 120 may include one or more of a CPU, an AP, and a communication processor (CP). The processor 120 performs operations or data processing for control and/or communication of, for example, at least one other elements of the electronic device 101. The processor 120 may be referred to as a controller, may include the controller as a part thereof, or may constitute the controller.

The memory 130 may include a volatile and/or nonvolatile memory. The memory 130 may store, for example, commands or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and/or the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic LED (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106). The communication interface 170 may include a CP, and the CP may constitute one of a plurality of modules of the communication interface 170. In an embodiment, the CP may be included in the processor 120.

Wireless communication may use, for example, as a cellular communication protocol, at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and/or the like. The wireless communication may include, for example, short-range communication 164. The short-range communication 164 may include, for example, at least one of wireless fidelity (WiFi), Bluetooth (BT), near field communication (NFC), a global navigation satellite system (GNSS), and/or the like. Depending on a usage area or bandwidth, the GNSS may include, for example, at least one of a GPS, a global navigation satellite system (Glonass), a Beidou navigation satellite system ("Beidou"), and a European global satellite-based navigation system (Galileo). Herein below, "GPS" may be used interchangeably with "GNSS". The wired communication may include, for example, at least one of a universal serial bus (USB), a high definition multimedia interface (HDMI), a recommended standard (RS)-232, a plain old telephone service (POTS), and/or the like. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
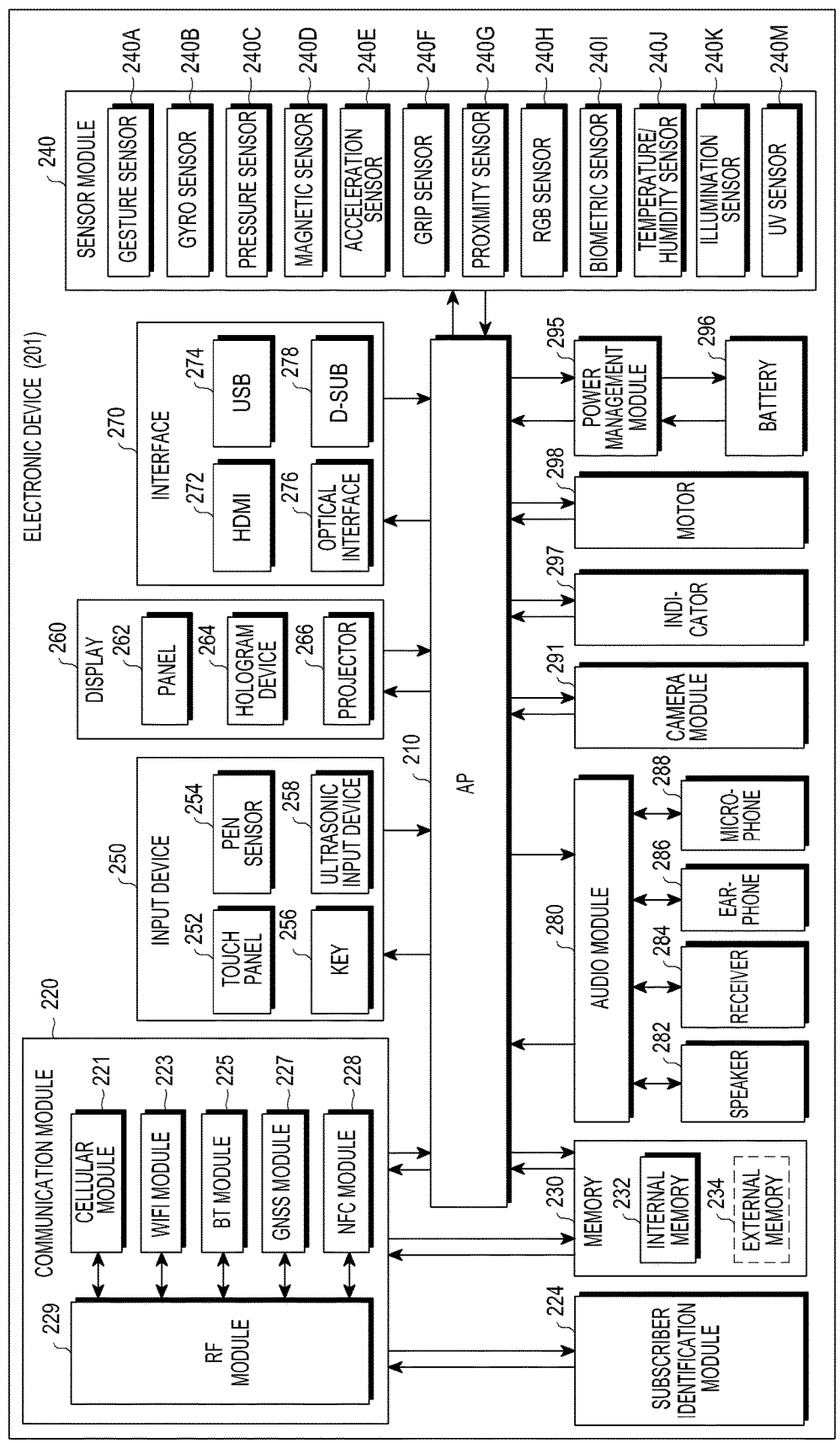
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may form the entire electronic device 101 illustrated in FIG. 1 or a part of the electronic device 101 illustrated in FIG. 1. The electronic device 201 may include one or more APs 210, a communication module 220, a memory 230, a sensor module 240, an input device 250, and a display 260, and the electronic device 201 may further include at least one of a subscriber identification module (SIM) 224, an interface 270, an audio module 280, a camera module 291, a power management module 295, a battery 296, an indicator 297, and a motor 298.

The processor 210 controls multiple hardware or software components connected to the processor 210 by driving an OS or an application program, and performs processing and operations with respect to various data. The processor 210 may be implemented with, for example, a system on chip (SoC). According to an embodiment, the processor 210 may further include a graphic processing unit (GPU) and/or an image signal processor (ISP). The processor 210 may include at least some of the elements illustrated in FIG. 2 (e.g., a cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a BT module 225, a GNSS module 227 (e.g., a GPS module, a Glonass module, a Beidou module, or a Galileo module), a NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a CP.

Each of the WiFi module 223, the BT module 225, the GNSS module 227, and the NFC module 228 may include, for example, a processor for processing data transmitted and received by a corresponding module. According to some embodiments, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may, for example, include at least one of a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, and the NFC module 228 may transmit and receive an RF signal through the separate RF module.

The SIM 224 may, for example, include a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc., mask ROM, flash ROM, NAND flash memory, NOR flash memory, etc., and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), or a fingerprint sensor. The sensor module 240 may further include a control circuit for controlling at least one sensor included therein. In some embodiments, the electronic device 201 may further include a processor configured to control the sensor module 240 as part of or separately from the processor 210, to control the sensor module 240 during a sleep state of the processor 210.

The input device 250 may, for example, include a touch panel 252, and may further include at least one of a (digital) pen sensor 254, a key 256, and an ultrasonic input device 258. The touch panel 252 may use at least one of a capacitive type, a resistive type, an infrared (IR) type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, and may further include a hologram device 264, and/or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram device 264, or the projector 266.

According to an embodiment, the interface 270 may include at least one of a HDMI 272, a USB 274, an optical interface 276, and a D-subminiature (D-Sub) 278. The interface 270 may be included in the communication interface 170 illustrated in FIG. 1. Additionally or alternatively, the interface 270 may include a mobile high-definition link (MHL) interface, an SD/MMC interface, or an Infrared Data Association (IrDA) interface.

The audio module 280 bi-directionally converts sound and an electric signal. At least one element of the audio module 280 may be included in the I/O interface 150 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an ISP, or a flash (e.g., an LED, a xenon lamp, etc.).

The power management module 295 manages power of the electronic device 201. According to an embodiment, the power management module 295 may include a power management IC (PMIC), a charger IC, or a battery fuel gauge. The PMIC may have a wired and/or wireless charging scheme. The wireless charging scheme includes, for example, at least one of a magnetic-resonance type, a magnetic induction type, and an electromagnetic type, and an additional circuit for wireless charging, for example, a coil loop, a resonance circuit, a rectifier, or the like may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or MediaFlo™.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
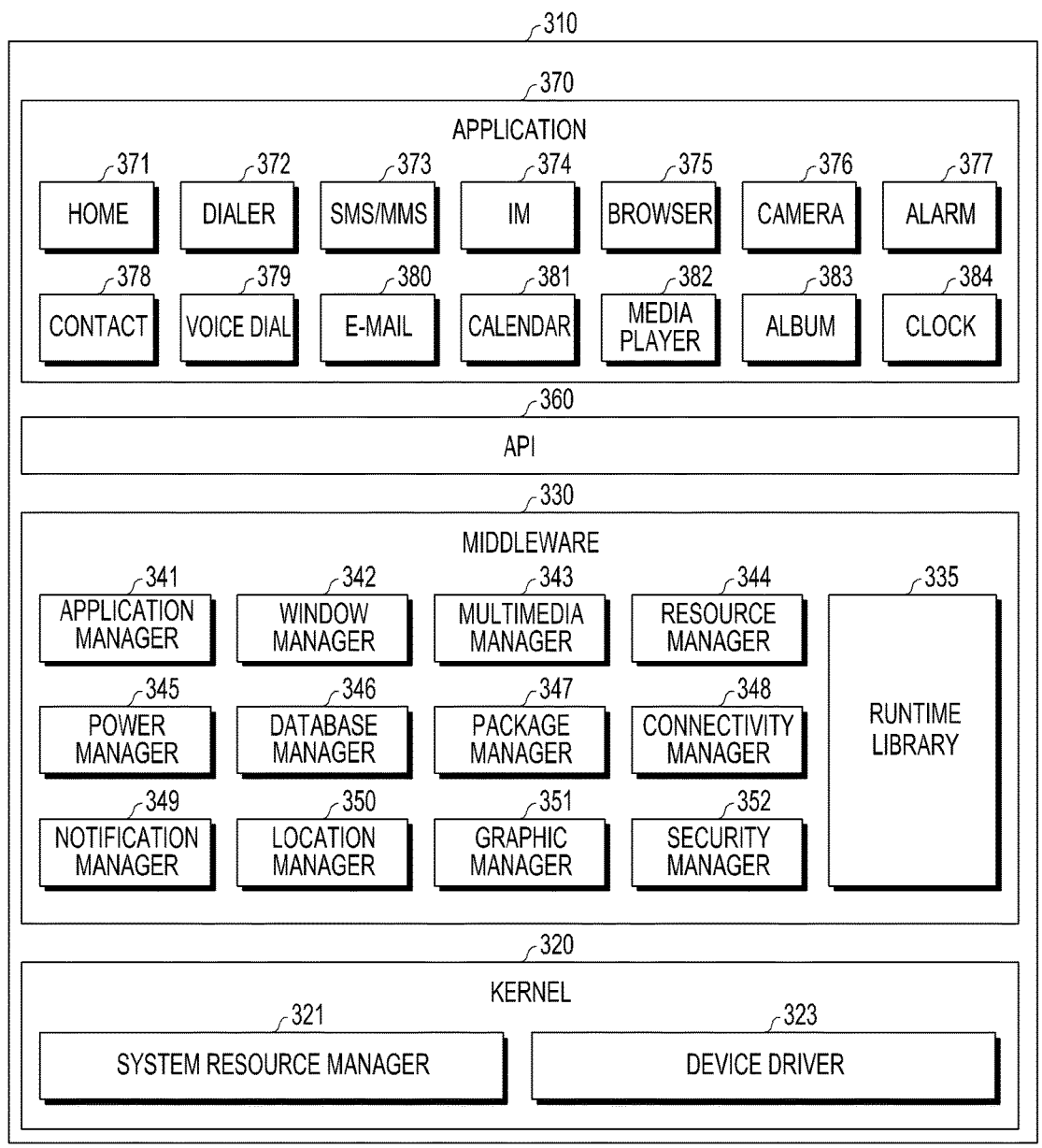
FIG. 3 is a block diagram of a programming module according to various embodiments of the present disclosure.

FIG. 3 is a block diagram of a programming module according to various embodiments of the present disclosure.

Referring to FIG. 3, a programming module 310 (e.g., the program 140) may include an OS for controlling resources associated with an electronic device (e.g., the electronic device 101) and/or various applications (e.g., the application program 147) executed on the OS. The OS may include Android, iOS, Windows, Symbian, Tizen, or Bada.

The programming module 310 may include, for example, a kernel 320, middleware 330, an API 360, and/or an application 370. At least a part of the programming module 310 may be preloaded on an electronic device or may be downloaded from an external device (e.g., the external device 102 or 104 or the server 106).

The kernel 320 (e.g., the kernel 141) may, for example, include a system resource manager 321 and/or a device driver 323. The system resource manager 321 may perform control, allocation, retrieval of system resources, and/or the like. According to an embodiment, the system resource manager 321 may include at least one of a process management unit, a memory management unit, a file system, and/or the like. The device driver 323 may include, for example, a display driver, a camera driver, a BT driver, a shared memory driver, a USB driver, a keypad driver, a WiFi driver, an audio driver, or an inter-process communication (IPC) driver.

The middleware 330 may provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an I/O, memory management, or calculation operation.

The application manager 341 manages a life cycle of at least one application among the applications 370. The window manager 342 manages a graphic user interface (GUI) resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or BT connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface (UI) relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 370 may include an application (e.g., health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least some of the programming module 310 may include, for example, modules, programs, routines, sets of instructions, or processes for performing one or more functions.

Figure 4:
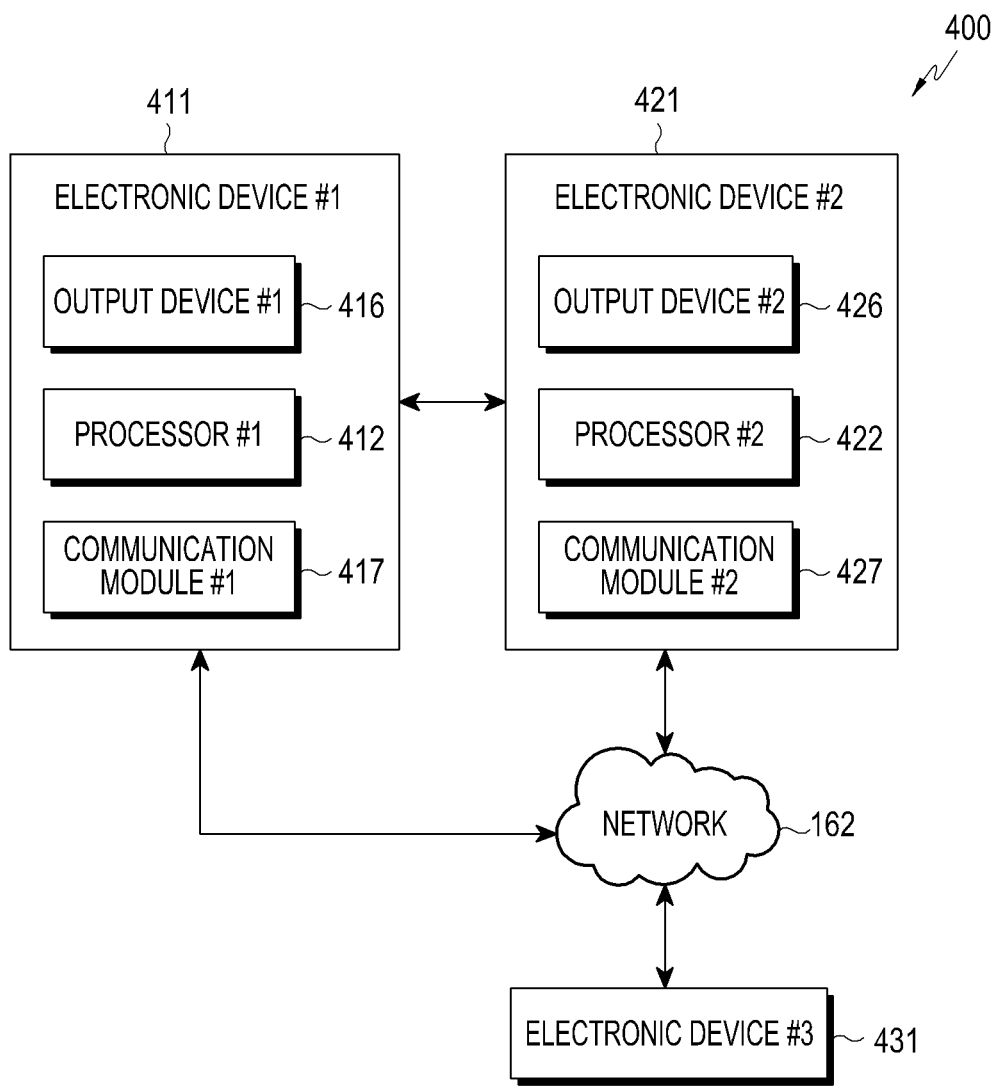
FIG. 4 is a diagram for describing a communication system according to various embodiments of the present disclosure.

FIG. 4 is a diagram for describing a communication system according to various embodiments of the present disclosure.

Referring to FIG. 4, a communication system 400 may include a first electronic device 411 (e.g., the electronic device 101 or 201), a second electronic device 421 (e.g., the electronic device 101 or 201), and a third electronic device 431 (e.g., the electronic device 101 or 201).

The first electronic device 411 may include a first output device 416 (e.g., the I/O interface 150, the display 160 or 260, the speaker 282) for outputting an image or sound, a first communication module 417 (e.g., the communication interface 170 or the communication module 220) for transmitting data to an external electronic device or receiving data from the external electronic device, and a first processor 412 (e.g., the processor 120 or 210) for implementing a function of the first electronic device 411 by controlling the first output device 416 and/or the first communication module 417.

The second electronic device 421 may include a second output device 426 (e.g., the I/O interface 150, the display 160 or 260, the speaker 282) for outputting an image or sound, a second communication module 427 (e.g., the communication interface 170 or the communication module 220) for transmitting data to an external electronic device or receiving data from the external electronic device, and a second processor 422 (e.g., the processor 120 or 210) for implementing a function of the second electronic device 421 by controlling the second output device 426 and/or the second communication module 427.

The third electronic device 431 may have a structure that is the same as/similar with the first electronic device 411 or the second electronic device 421.

The second processor 422 outputs an image or sound corresponding to data through the second output device 426.

The second processor 422 automatically transmits the information associated with the data or an application for outputting the data to the first electronic device 411 through the second communication module 427. For example, the second processor 422 may send a message including the information associated with the data or the application for outputting the data to the first electronic device 411.

The first processor 412 receives the information associated with the data or the application for outputting the data from the second electronic device 421 through the first communication module 417.

The first processor 412 displays a graphic element including at least a part of information associated with the data or the application for outputting the data on the first output device 416 or the first display.

The first processor 412 detects a user input with respect to the graphic element through the first input device (e.g., the input device 250) or the first display.

The first processor 412 outputs at least a part of the data through the first output device 416 based on output information of the data generated by the second electronic device 421 (or information regarding output of the data by the second electronic device 421) in response to the user input.

According to an embodiment, the first processor 412 receives the output information of the data from the second electronic device 421 through the first communication module 417.

According to an embodiment, the first processor 412 receives the data from the second electronic device 421 through the first communication module 417 or receives the data from the third electronic device 431 through the first communication module 417 and the network 162.

According to an embodiment, the first processor 412 outputs a part of the data, which follows an output stop point in time, through the first output device 416 based on the output information of the data.

According to an embodiment, the first processor 412 requests the second electronic device 421 or the third electronic device 431 to stream the part of the data, which follows the output stop point in time, through the first communication module 417 based on the output information of the data. The first processor 412 outputs the part of the streamed data, which follows the output stop point in time, from the second electronic device 421 or the third electronic device 431 through the first output device 416.

Figure 5:
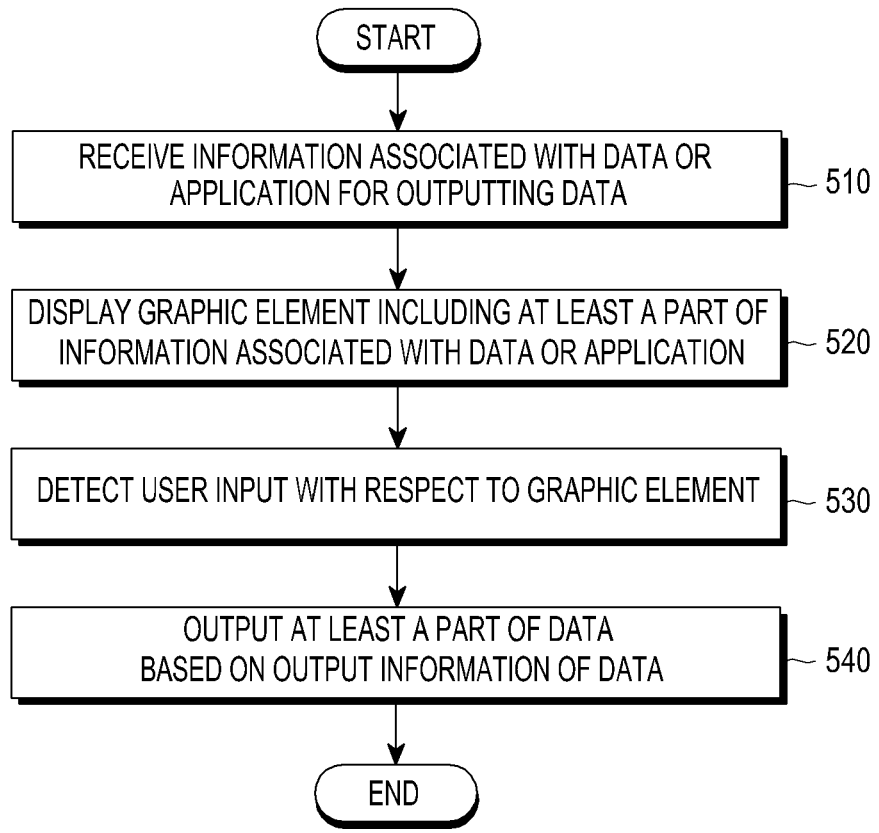
FIG. 5 is a flowchart illustrating an operation method of a first electronic device according to various embodiments of the present disclosure.

FIG. 5 is a flowchart illustrating an operation method of a first electronic device according to various embodiment of the present disclosure.

Referring to FIG. 5, an operation method of the first electronic device may include operations 510 through 540. The operation method of the first electronic device may be performed by at least one of the first electronic device (e.g., the electronic device 101, 201, or 411), the first processor (e.g., the processor 120, 210, or 412) of the first electronic device, and the first controller of the first electronic device.

In operation 510, the first electronic device receives information associated with data or an application for outputting the data from the second electronic device (e.g., the electronic device 101, 201, or 421) through the first communication module (e.g., the communication interface 170, the communication module 220 or 417).

According to an embodiment, before receiving information associated with the data or the application, the first electronic device establishes a wired or wireless communication connection with the second electronic device.

For example, the first electronic device may set up a wired communication connection with the second electronic device through the first communication module supporting USB, HDMI, or the like.

For example, the first electronic device may set up a wireless communication connection with the second electronic device through the first communication module supporting WiFi 802.11x, WiFi Direct, IR ZigBee, NFC, radio-frequency identification (RFID), BT, ultra wideband (UWB), and/or the like.

For example, the wireless/wired communication connection may be initiated by an automatic device discovery by at least one of the first electronic device and the second electronic device, a user's connection command with respect to any one of the first electronic device and the second electronic device, a connector connection between the first electronic device and the second electronic device by a user, and execution of identical applications installed in the first electronic device and the second electronic device.

According to an embodiment, information associated with the data or the application may include metadata of the data.

According to an embodiment, information associated with the data or the application may include identification information of the data, identification information of the application, a title of the data, a name associated with the data, at least a part of the data, the origin of the data, an address associated with the data, a description of the data, a quantity of the data, a time associated with the data, and/or the like.

According to an embodiment, the data may include at least one of music data, video data, image data, Internet data, document data, message data, mail data, and/or the like.

According to an embodiment, the application may include at least one of a music application, a video application, an image application, an Internet application (or a browser), a document application, a message application, a mail application, and/or the like.

In operation 520, the first electronic device displays a graphic element including at least a part of the information associated with the data or the application on the first output device (e.g., the first output device 416) or the first display (e.g., the display 160 or 260).

According to an embodiment, the graphic element may include at least one of a text, an image, a file, an icon, an application screen, a GUI such as a dashboard, a panel, a window or the like, a message, and/or the like.

In operation 530, the first electronic device detects a user input with respect to the graphic element through the first input device (e.g., the input device 250) or the first display.

For example, the user input may be performed by a touch using a user's finger or an electronic pen, a click of a button of a mouse, a command input through a keyboard, and/or the like.

In operation 540, the first electronic device outputs at least a part of the data through the first output device based on output information of the data generated by the second electronic device (or information regarding output of the data by the second electronic device) in response to the user input.

According to an embodiment, the output information of the data may include at least one of at least a part of the data, information regarding a play position, information regarding a play time (or point in time), information regarding the amount of data which has been played, information regarding a remaining time, information regarding the remaining amount to be played, information regarding a stop position, information regarding a stop time (or point in time), information regarding an output position, information regarding an output time (or point in time), information regarding an output order, a relative relationship or order among data elements included in the data, device/application configuration information for output of the data, and/or the like.

According to an embodiment, the first electronic device receives the output information of the data from the second electronic device through the first communication module.

According to an embodiment, the first electronic device receives the data from the second electronic device through the first communication module. According to an embodiment, the first electronic device outputs a part of the data, which follows an output stop point in time, through the first output device based on the output information of the data.

According to an embodiment, the first electronic device requests the second electronic device or the third electronic device to stream the part of the data, which follows the output stop point in time, through the first communication module based on the output information of the data. The first electronic device outputs the part of the streamed data, which follows the output stop point in time, from the second electronic device or the third electronic device (e.g., the third electronic device 431) through the first output device.

According to an embodiment, the first electronic device sends a message including at least a part of the output information of the data and requesting streaming of the data to the second electronic device or the third electronic device through the first communication module. The first electronic device outputs the data streamed from the second electronic device or the third electronic device through the first output device.

According to an embodiment, the first electronic device transmits output information of the data generated by the first electronic device (or information regarding output of the data by the first electronic device) to the second electronic device through the first communication module.

According to an embodiment, the first electronic device receives a request associated with the data (e.g., a request for the output information of the data generated by the first electronic device) from the second electronic device through the first communication module. The first electronic device transmits the output information of the data to the second electronic device through the first communication module in response to the request.

According to an embodiment, the first electronic device outputs a first data element of the data through the first output device. The first electronic device displays a graphic element corresponding to a second data element of the data associated with the first data element on the first output device (or the first display) based on the output information of the data. The first electronic device may output the second data element through the first output device, if detecting a user's selection with respect to the graphic element corresponding to the second data element.

According to an embodiment, the first electronic device receives the data from the second electronic device through the first communication module. The first electronic device arranges data elements of the data by time and displays the data elements on the first output device (or the first display) based on the output information of the data generated by the second electronic device. For example, the data elements may correspond to messages transmitted and received between the second electronic device and the third electronic device.

According to an embodiment, the first electronic device generates a message associated with the data. The first electronic device sends the message to the second electronic device through the first communication module. The second electronic device sends the message to the third electronic device through the second communication module (e.g., the communication interface 170, the communication module 220) and the network (e.g., the network 162). The second electronic device sends output information of the message to the first electronic device. The first electronic device adds the message to the data elements and displays the message on the first output device (or the first display) based on the output information of the message.

According to an embodiment, the first electronic device changes device settings (e.g., a volume or type of a sound, a screen brightness, etc.) of the first electronic device based on the output information of the data generated by the second electronic device. The first electronic device outputs at least a part of the data through the first output device based on the changed device settings.

FIGS. 6A to 6D are views for describing an operation method of an electronic device according to various embodiments of the present disclosure.

Figure 6A:
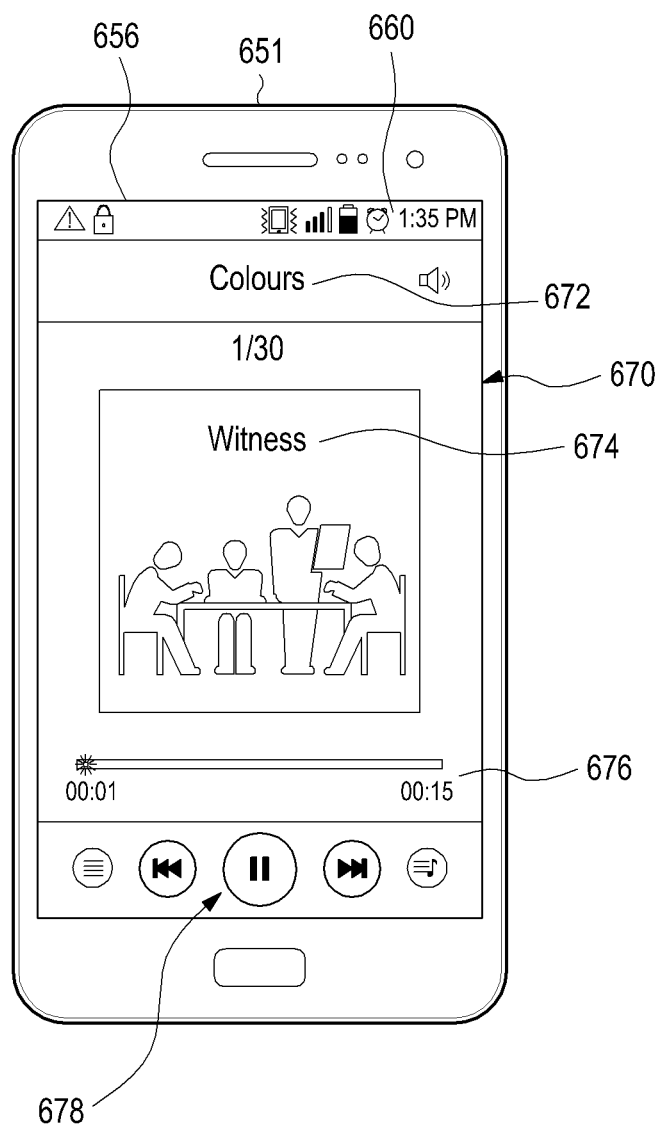
FIGS. 6A to 6D are views for describing an operation method of an electronic device according to various embodiments of the present disclosure.

Referring to FIG. 6A, a second electronic device 651 (e.g., the electronic device 101, 201, or 421) displays a status bar 660 and a screen 670 of a music application on a second display 656 (e.g., the display 160 or 260, the first output device 416).

The status bar 660 is displayed on an upper portion of the second display 656 and may include at least one of an indicator indicating a charging state of a battery, an indicator indicating strength of a received signal, an indicator indicating a current time, and/or the like.

The screen 670 of the music application may include at least one of at least one items 672 and 674 for indicating metadata of music data (or a music file) (e.g., a name of a singer, a music title, an album title, a total play time of music data, etc.), an item 676 for indicating output (or play) information of the music data (e.g., an output (or play) time, an output (or play) position, etc.), at least one item 678 for executing a function of the music application or controlling output (or play) of the music data (e.g., a pause/play button, a rewind button, a fast forward button, a menu button, etc.), and/or the like.

For example, the second electronic device 651 (or the music application) may output the music data through a second speaker (e.g., the speaker 282) based on a user input for selecting the music data or the pause/play button.

The second electronic device 651 automatically transmits information associated with the music data or the music application to the first electronic device 611 through the second communication module (e.g., the communication interface 170, the communication module 220) in response to execution (or activation) of the music application, output (or play) of the music data, or connection with the first electronic device 611 (e.g., the electronic device 101, 201, or 411).

According to an embodiment, information associated with the music data or the music application may include identification information of the music data, identification information of the music application, a title of the music data, a name associated with the music data, at least a part of the music data, the origin of the music data, an address associated with the music data, a description of the music data, a quantity of the music data, a time associated with the music data, and/or the like.

The first electronic device 611 receives the information associated with the music data or the music application through the first communication module (e.g., the communication interface 170, the communication module 220 or 417).

Figure 6B:
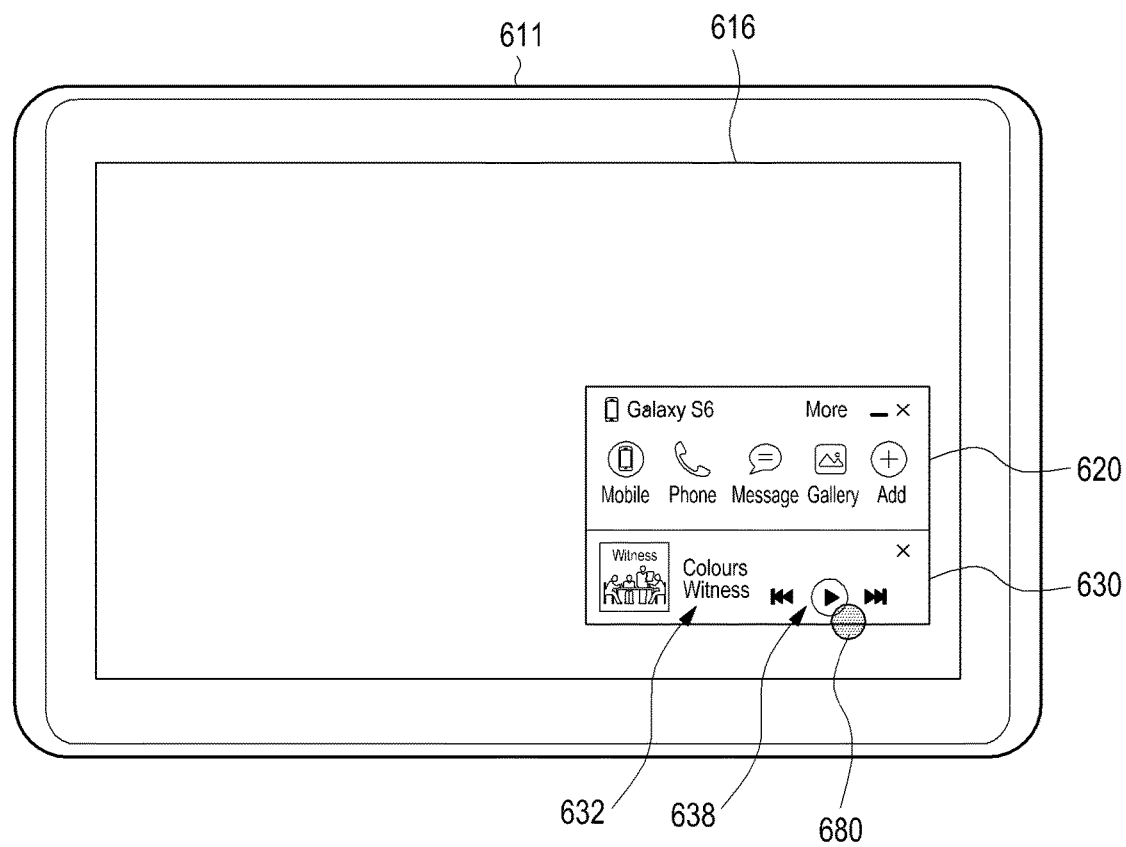

Referring to FIG. 6B, the first electronic device 611 displays a screen 620 of a remote control application and a graphic element 630 configured based on the information associated with the music data or the music application on the first display 616 (e.g., the display 160 or 260, the second output device 426).

The screen 620 of the remote control application may include at least one item for remotely controlling the second electronic device 651. For example, at least one item for remotely controlling the second electronic device 651 may include at least one of an item for mirroring a screen of the second electronic device 651 on a screen of the first electronic device 611, an item for executing a phone function of the second electronic device 651, an item for executing a message function of the second electronic device 651, an item for executing a gallery function of the second electronic device 651, and/or the like.

The graphic element 630 may include at least one of at least one item 632 for indicating at least a part of the information associated with the music data or the music application, at least one item 638 for controlling output (or play) of the music data (e.g., a pause/play button, a rewind button, a fast forward button, etc.), and/or the like.

The at least a part of the information associated with the music data or the music application may include metadata of the music data (e.g., a singer's name, a music title, an album title, a total play time of the music data, etc.).

The first electronic device 611 detects a user input 680 with respect to the graphic element 630 through the first input device (e.g., the input device 250) or the first display 616. For example, the first electronic device 611 may detect the user input 680 for selecting the at least one item 638 for controlling output (or play) of the music data (e.g., a pause/play button).

The first electronic device 611 transmits, to the second electronic device 651 through the first communication module, a request associated with the music data (e.g., a handover request for a play operation of the music data) or a request for transmitting output information of the music data. For example, the request may include identification information of the music data or identification information of the music application.

Figure 6C:
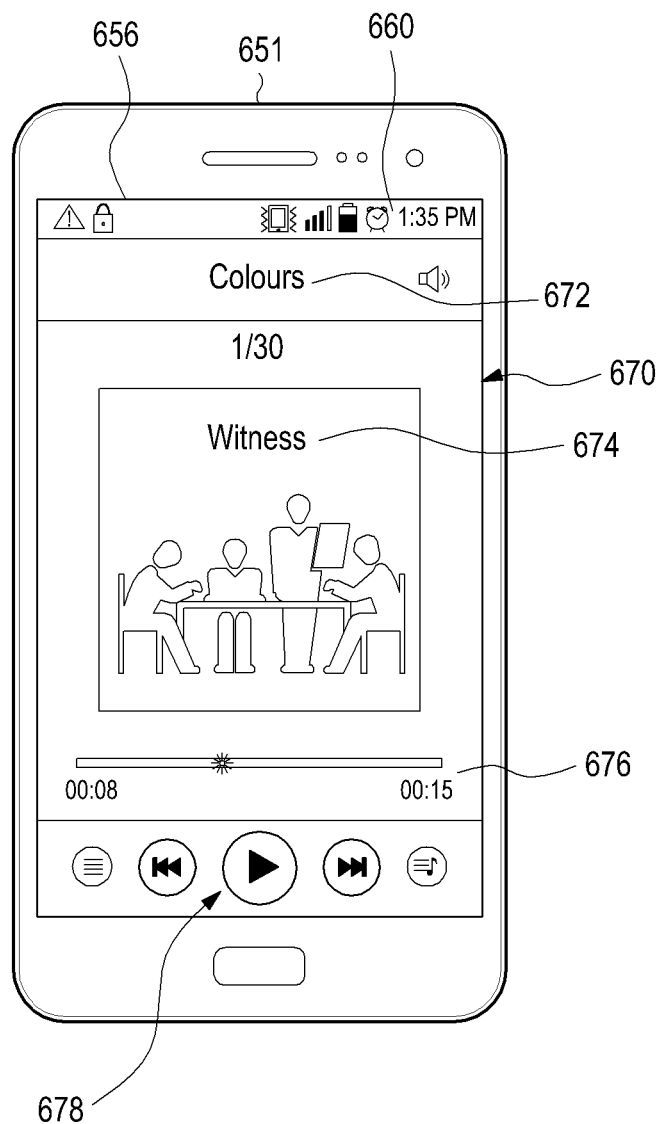

Referring to FIG. 6C, the second electronic device 651 stops outputting (or playing) the music data and transmits the output information of the music data to the first electronic device 611 through the second communication module in response to the request.

According to an embodiment, the output information of the music data includes at least one of information regarding an output (or play) position, information regarding an output (or play) time (or point in time), information regarding the remaining time, information regarding a stop position, information regarding a stop time (or point in time), device/application configuration information for outputting the data, and/or the like. The output information of the music data may further include identification information of the music data.

Figure 6D:
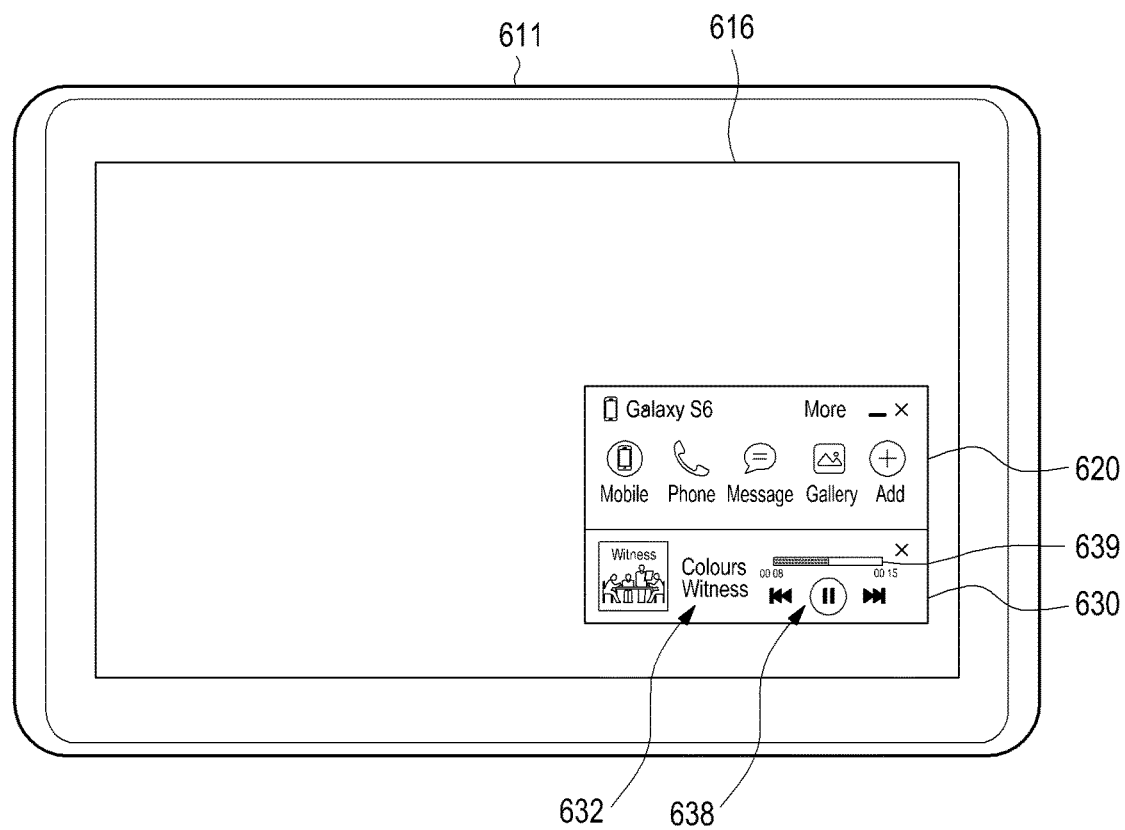

Referring to FIG. 6D, the first electronic device 611 outputs a part of the music data, which follows an output stop point in time (i.e., a stop point in time in the second electronic device 651), through a first speaker (e.g., the speaker 282) based on the output information of the music data.

According to an embodiment, the first electronic device 611 displays an item 639 for indicating the output information of the music data on the first display 616.

According to an embodiment, the first electronic device 611 receives the music data from the second electronic device 651 through the first communication module.

According to an embodiment, the first electronic device 611 requests the second electronic device 651 or the third electronic device (e.g., a third electronic device 431) to stream the part of the data, which follows the output stop point in time (i.e., the stop point in time in the second electronic device 651), through the first communication module based on the output information of the music data received from the second electronic device 651.

According to an embodiment, the first electronic device 611 sends a message including at least a part of the output information of the music data and requesting streaming of the music data to the second electronic device 651 or the third electronic device through the first communication module.

According to an embodiment, the first electronic device 611 detects a user input for a handover of a music operation through the first input device (or the first display 616). For example, the first electronic device 611 may stop outputting (or playing) the music data or detect a user input for stopping displaying the graphic element 630. The first electronic device 611 stops outputting (or playing) the music data and transmits the output information of the music data to the second electronic device 651 through the first communication module in response to the user input. The second electronic device 651 outputs a part of the music data, which follows an output stop point in time (i.e., a stop point in time in the first electronic device 611), through a second speaker based on the output information of the music data received from the first electronic device 611.

According to an embodiment, the second electronic device 651 detects a user input for a handover of a music operation through the second input device (or the second display 656). For example, the second electronic device 651 may detect a user input for selecting at least one item 678 for executing a function of the music application or controlling output (or play) of the music data (e.g., a pause/play button). The second electronic device 651 transmits a request associated with the music data (e.g., a handover request for a play operation of the music data) to the first electronic device 611 through the second communication module in response to the user input. The first electronic device 611 stops outputting (or playing) the music data and transmits the output information of the music data to the second electronic device 651 through the first communication module in response to the user input. The second electronic device 651 outputs a part of the music data, which follows an output stop point in time (i.e., a stop point in time in the first electronic device 611), through the second speaker based on the output information of the music data received from the first electronic device 611.

FIGS. 7A to 7E are views for describing an operation method of an electronic device according to various embodiments of the present disclosure.

Figure 7A:
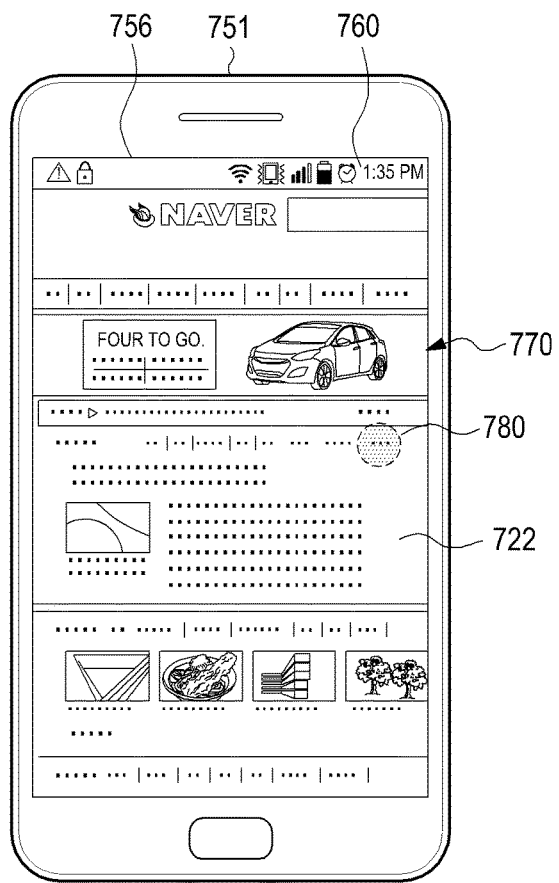
FIGS. 7A to 7E are views for describing an operation method of an electronic device according to various embodiments of the present disclosure.

Referring to FIG. 7A, a second electronic device 751 (e.g., the electronic device 101, 201, or 421) displays a status bar 760 and a first screen 770 of an Internet application (or an Internet browser) including first Internet data 722 (or a first Internet data element) corresponding to a main homepage of a particular website on a second display 756 (e.g., the display 160 or 260, the second output device 426).

The second electronic device 751 detects a user input 780 with respect to the first screen 770 through a second input device (e.g., the input device 250) or the second display 756.

For example, the second electronic device 751 may detect the user input 780 for selecting a weather item on the first screen 770.

Figure 7B:
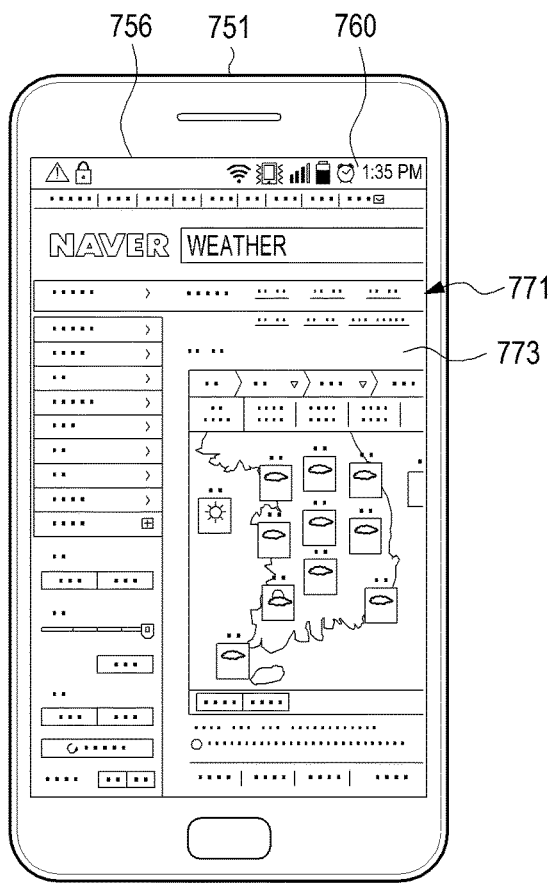

Referring to FIG. 7B, the second electronic device 751 displays a second screen 771 of an Internet application (or an Internet browser) including second Internet data 773 (or a second Internet data element) in response to the user input 780. For example, the second electronic device 751 may display the second screen 771 including the second Internet data 773 corresponding to a weather-related web page of the particular website in response to the user input 780.

The second electronic device 751 automatically transmits information associated with the Internet data or the Internet application to the first electronic device through a second communication module (e.g., the communication interface 170, the communication module 220) in response to execution (or activation) of the Internet application, output (or play) of the Internet data, or connection with the first electronic device (e.g., the electronic device 101, 201, or 411).

According to an embodiment, information associated with the Internet data or the Internet application may include identification information of the Internet data, identification information of the Internet application, at least a part of the Internet data, the origin of the Internet data, an address associated with the Internet data, a description of the Internet data, and/or the like.

The first electronic device receives the information associated with the Internet data or the Internet application through the first communication module (e.g., the communication interface 170, the communication module 220 or 417).

Figure 7C:
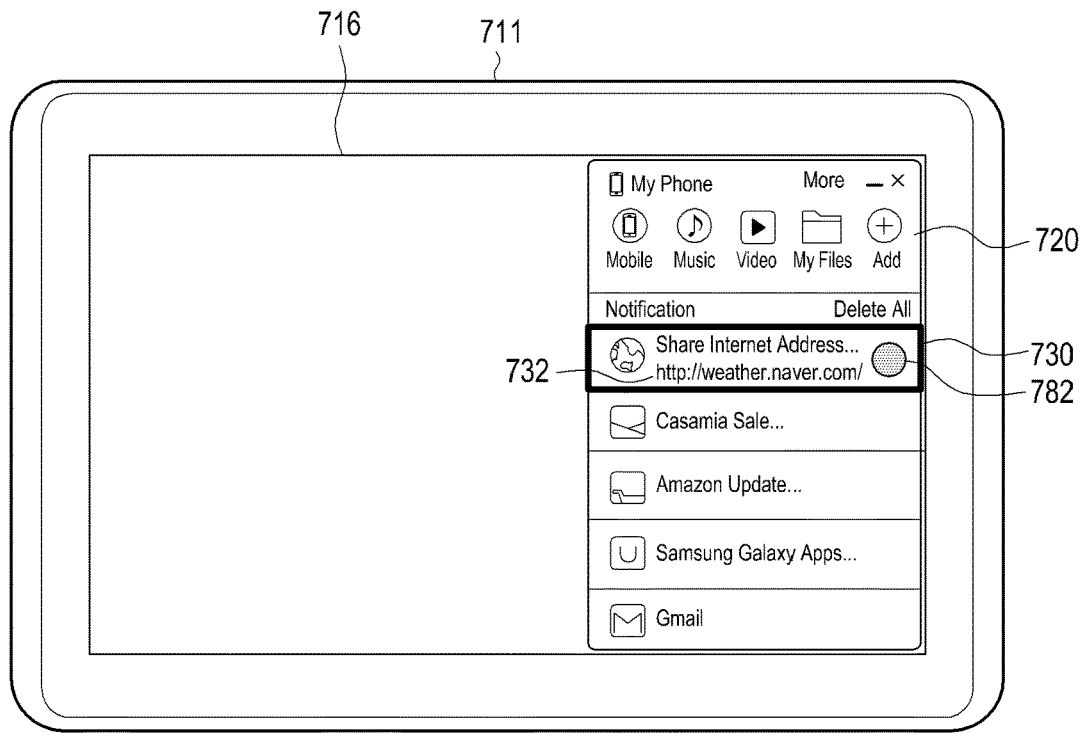

Referring to FIG. 7C, a first electronic device 711 (e.g., the electronic device 101, 201, or 411) displays a screen 720 of a remote control application and a graphic element 730 configured based on the information associated with the Internet data or the Internet application on a first display 716 (e.g., the display 160 or 260, the first output device 416).

The screen 720 of the remote control application may include at least one item for remotely controlling the second electronic device 751. For example, at least one items for remotely controlling the second electronic device 751 may include at least one of an item for mirroring a screen of the second electronic device 751 on a screen of the first electronic device 711, an item for executing a music play function of the second electronic device 751, an item for executing a video play function of the second electronic device 751, an item for executing a file/folder search function of the second electronic device 751, and/or the like.

The graphic element 730 may include at least one item 732 (e.g., an Internet address (or a web address)) for displaying at least a part of the information associated with the Internet data or the Internet application.

The first electronic device 711 detects a user input 782 with respect to the graphic element 730 through the first input device (e.g., the input device 250) or the first display 716. For example, the first electronic device 711 may detect the user input 782 for selecting the at least one item 732 for displaying at least a part of the information associated with the Internet data or the Internet application.

The first electronic device 711 transmits, to the second electronic device 751 through the first communication module, a request associated with the Internet data (e.g., a handover request for an Internet operation) or a request for transmitting output information of the Internet data in response to the user input 782. For example, the request may include identification information of the Internet data or identification information of the Internet application.

The second electronic device 751 transmits the output information of the Internet data to the first electronic device 711 through the second communication module in response to the request.

According to an embodiment, the output information of the Internet data may include at least one of information regarding an Internet address (or a web address), information about an Internet search history, favorites information, information regarding a relative relationship or order among Internet data elements, device/application configuration information for outputting Internet data, and/or the like.

Figure 7D:
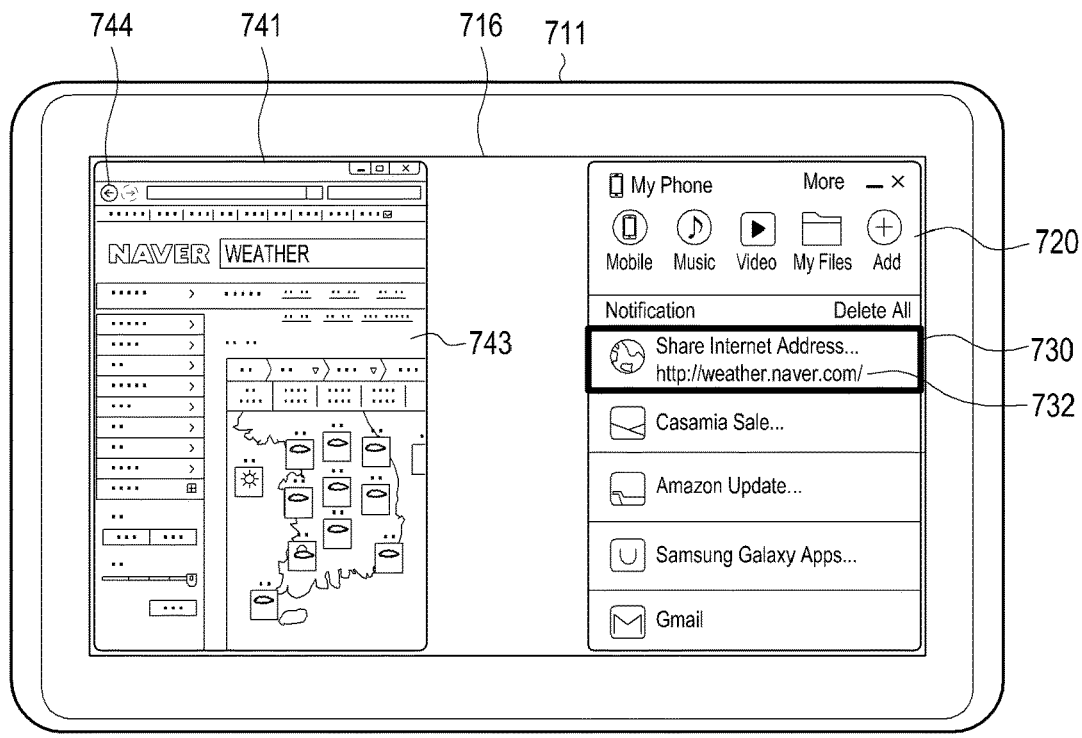

Referring to FIG. 7D, the first electronic device 711 displays a second screen 741 of an Internet application (or an Internet browser) including second Internet data 743 (or a second Internet data element) corresponding to a weather-related web page of the particular website based on the output information of the Internet data. The second screen 741 of the Internet application may include a back button 744 activated based on the output information of the Internet data.

Figure 7E:
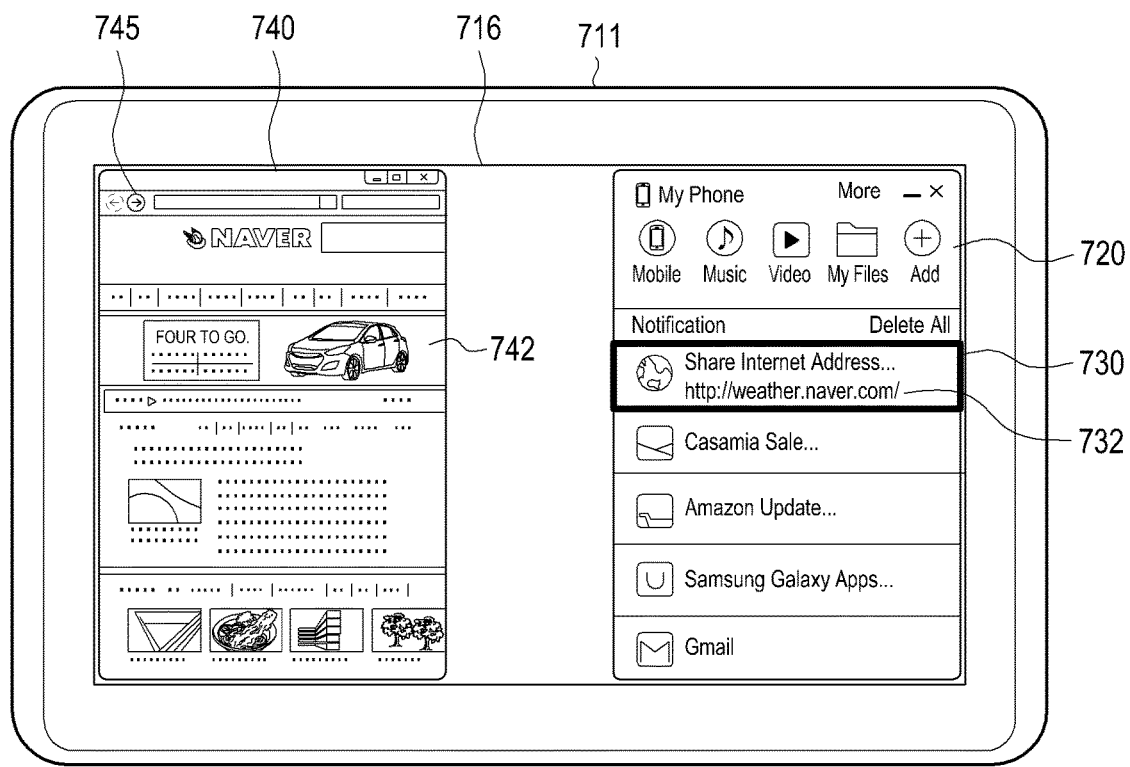

Referring to FIG. 7E, the first electronic device 711 displays a first screen 740 of an Internet application (or an Internet browser) including first Internet data 742 (or a first Internet data element) corresponding to a main home page of the particular website in response to a user input for selecting the back button 744. The first screen 740 of the Internet application may include an activated forward button 745. For example, the first electronic device 711 may display the second screen 741 as illustrated in FIG. 7D in response to the user input for selecting the forward button 745.

FIGS. 8A to 8E are views for describing an operation method of an electronic device according to various embodiments of the present disclosure.

Figure 8A:
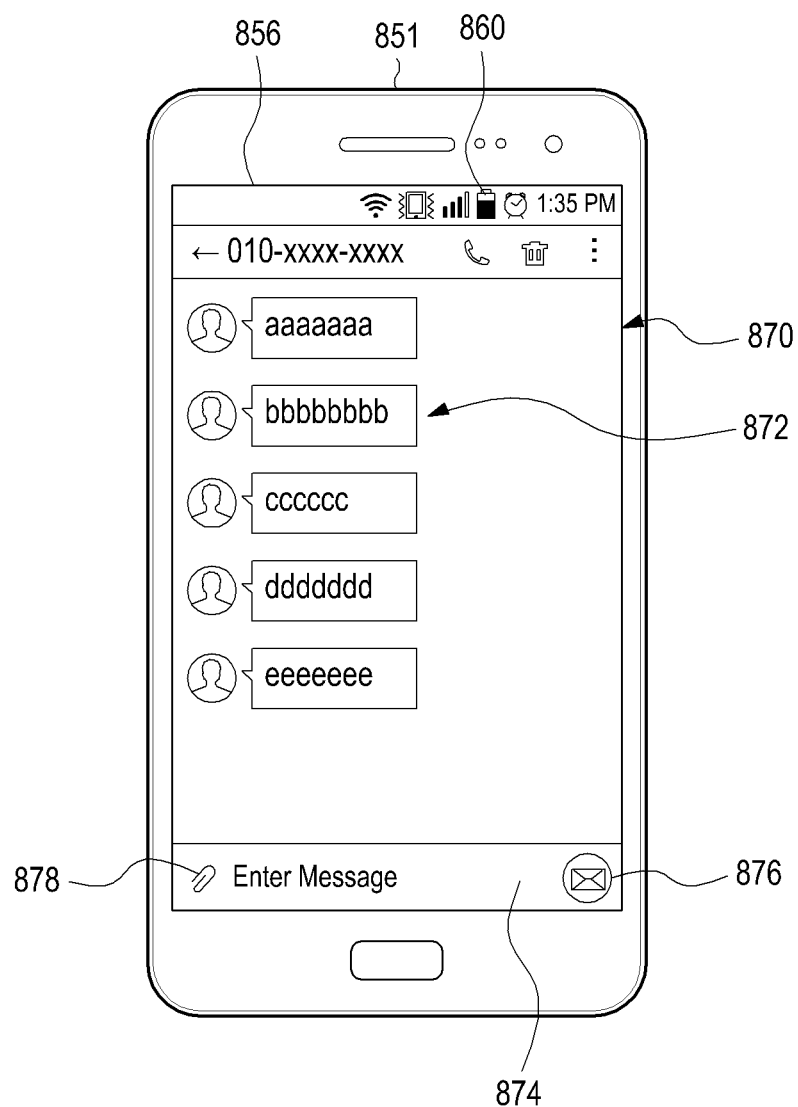
FIGS. 8A to 8E are views for describing an operation method of an electronic device according to various embodiments of the present disclosure.

Referring to FIG. 8A, a second electronic device 851 (e.g., the electronic device 101, 201, or 421) displays a status bar 860 and a screen 870 of a message application on a second display 856 (e.g., the display 160 or 260, the second output device 426).

The status bar 860 is displayed on an upper portion of the second display 856 and may include at least one of an indicator indicating a charging state of a battery, an indicator indicating a strength of a received signal, an indicator indicating a current time, and/or the like.

The screen 870 of the message application may include at least one of message data 872 in which a message (or a message data element) of a user of the second electronic device 851 and a message (or a message data element) of a counterpart received from a third electronic device (e.g., the third electronic device 431) communicating with the second electronic device 851 are chronologically arranged, an input window 874 for inputting a message, a send button 876 for sending a message being input to the input window 874 to the third electronic device, an attach button 878 for attaching a file to be transmitted to the third electronic device, and/or the like. Herein below, the window may be referred to as at least one of a window, a UI, a GUI, and/or the like.

The second electronic device 851 automatically transmits information associated with the message data or the message application to the first electronic device 811 through a second communication module (e.g., the communication interface 170, the communication module 220) in response to execution (or activation) of the message application, output (or reception/transmission) of the message data (or a message), or connection with the first electronic device 811 (e.g., the electronic device 101, 201, or 411).

Figure 8B:
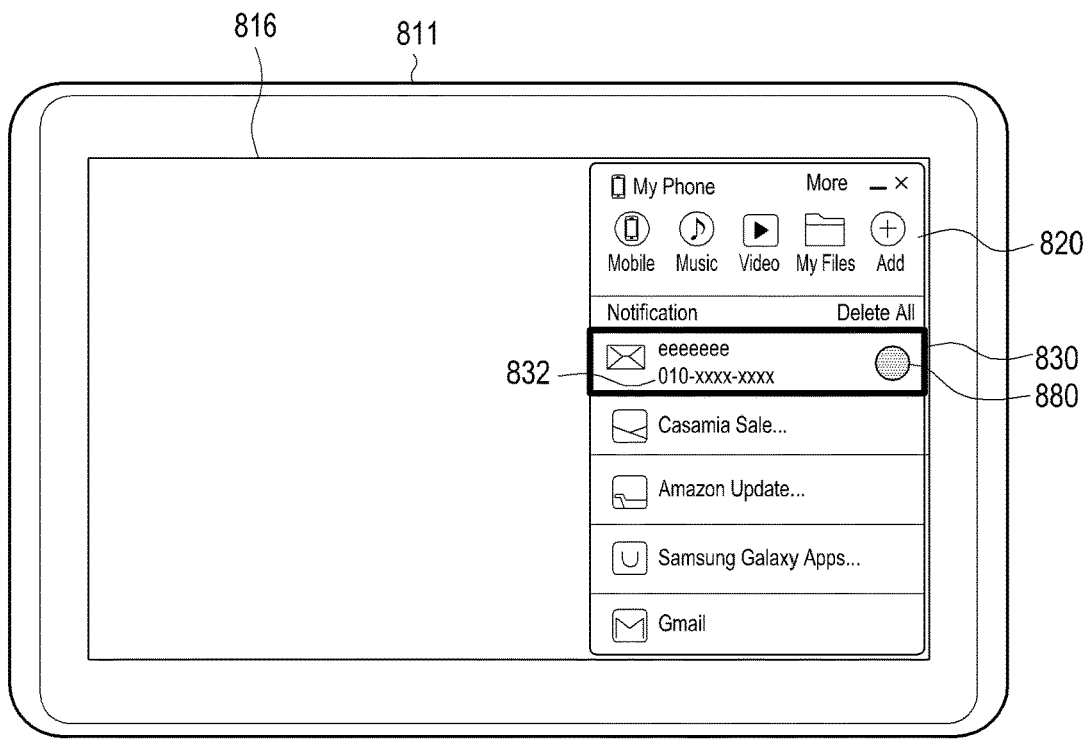

Referring to FIG. 8B, a first electronic device 811 (e.g., the electronic device 101, 201, or 411) displays a screen 820 of a remote control application and a graphic element 830 configured based on the information associated with the message data or the message application on a first display 816 (e.g., the display 160 or 260, the first output device 416).

The screen 820 of the remote control application may include at least one item for remotely controlling the second electronic device 851. For example, at least one items for remotely controlling the second electronic device 851 may include at least one of an item for mirroring a screen of the second electronic device 851 on a screen of the first electronic device 811, an item for executing a music play function of the second electronic device 851, an item for executing a video play function of the second electronic device 851, an item for executing a file/folder search function of the second electronic device 851, and/or the like.

The graphic element 830 may include at least one item 832 (e.g., a recently output (or received/sent) message) for displaying at least a part of the information associated with the message data or the message application.

The first electronic device 811 detects a user input 880 with respect to the graphic element 830 through the first input device (e.g., the input device 250) or the first display 816. For example, the first electronic device 811 may detect the user input 880 for selecting the at least one item 832 for displaying at least a part of the information associated with the message data or the message application.

The first electronic device 811 transmits, to the second electronic device 851 through the first communication module in response to the user input 880, a request associated with the message data (e.g., a handover request for the message operation) or a request for transmitting output information of the message data. For example, the request may include identification information of the message data or identification information of the message application.

The second electronic device 851 transmits the output information of the message data to the first electronic device 811 through the second communication module in response to the request.

According to an embodiment, the output information of the message data may include at least one of identification information regarding a message recipient/sender, messages, information regarding a relative relationship or order among messages, device/application configuration information for outputting message data, and/or the like.

Figure 8C:
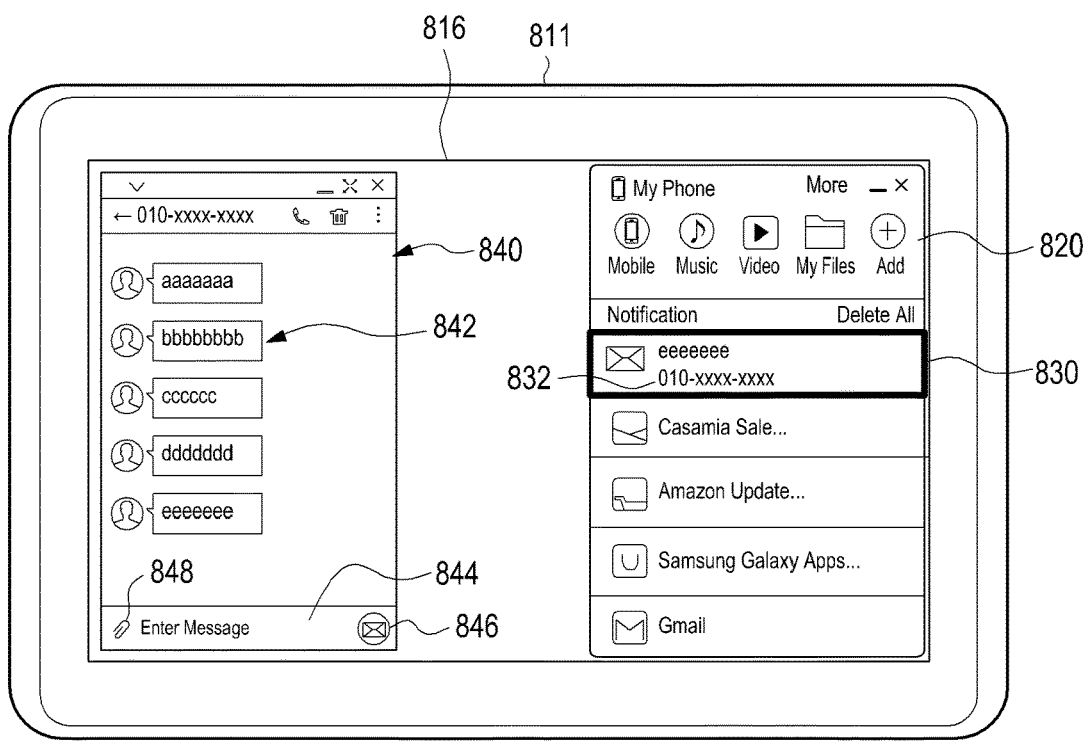

Referring to FIG. 8C, the first electronic device 811 displays a screen 840 of a message application including the message data 842 based on the output information of the message data.

The screen 840 of the message application may include at least one of message data 842 in which a message (or a message data element) of a user of the second electronic device 851 and a message (or a message data element) of a counterpart received from a third electronic device (e.g., the third electronic device 431) communicating with the second electronic device 851 are chronologically arranged, an input window 844 for inputting a message, a send button 846 for sending a message being input to the input window 844 to the third electronic device, an attach button 848 for attaching a file to be transmitted to the third electronic device, and/or the like.

The first electronic device 811 transmits a message being input to the input window 844 to the second electronic device 851 through the first communication module in response to a user input for selecting the send button 846.

Figure 8D:
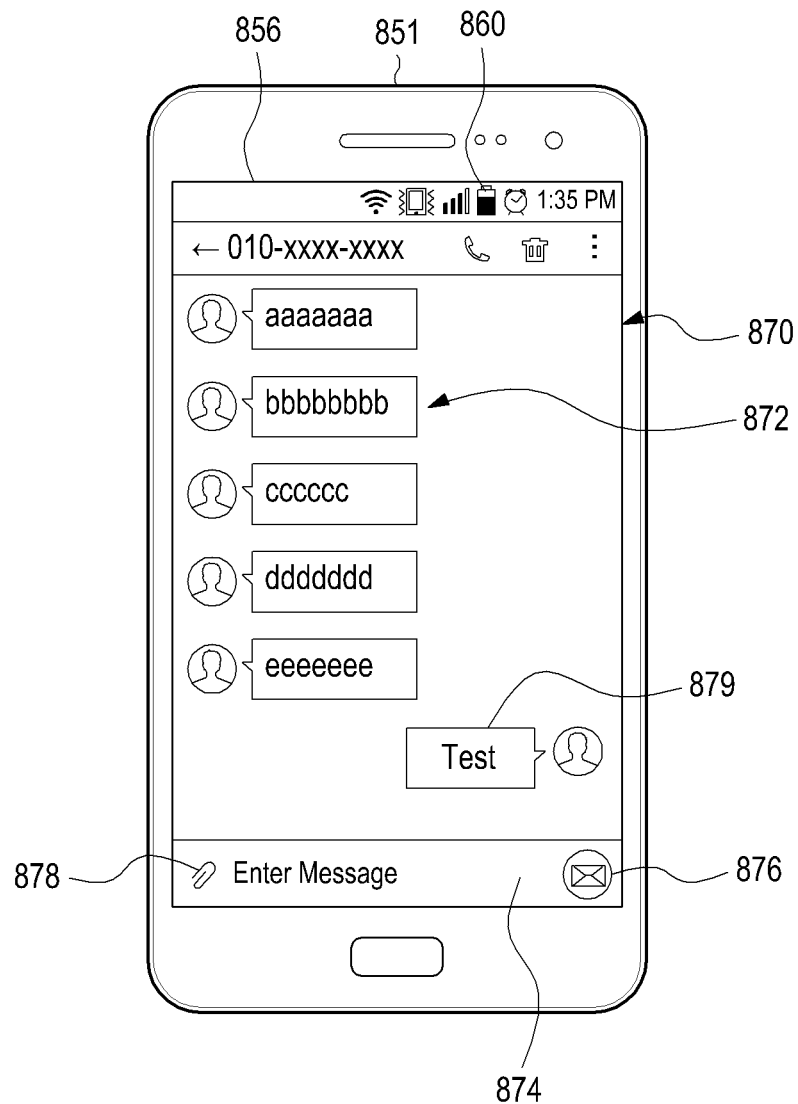

Referring to FIG. 8D, the second electronic device 851 sends a message 879 received from the first electronic device 811 to the third electronic device through the second communication module and the network (e.g., the network 162).

The second electronic device 851 automatically transmits information associated with the message data or the message application to the first electronic device 811 through a second communication module in response to output (or transmission) of the message 879 (or the message data). The information associated with the message data or the message application may include a newly received/sent message.

Figure 8E:
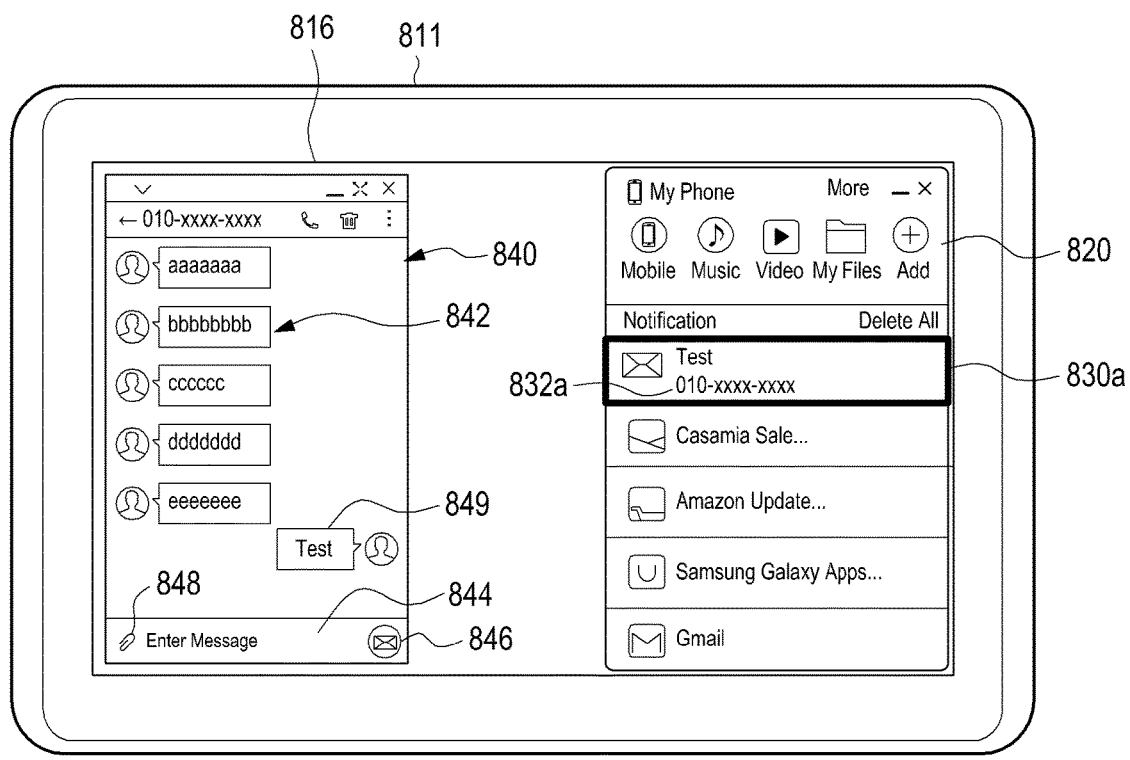

Referring to FIG. 8E, the first electronic device 811 displays a graphic element 830a configured based on the information associated with the message data or the message application on the first display 816.

The graphic element 830a may include at least one item 832a (e.g., a recently output (or received/sent) message) for displaying at least a part of the information associated with the message data or the message application.

The first electronic device 811 adds a message 849 newly sent to the third electronic device to the existing message data 842 and displays the newly sent message 849 and the existing message data 842.

Figure 9:
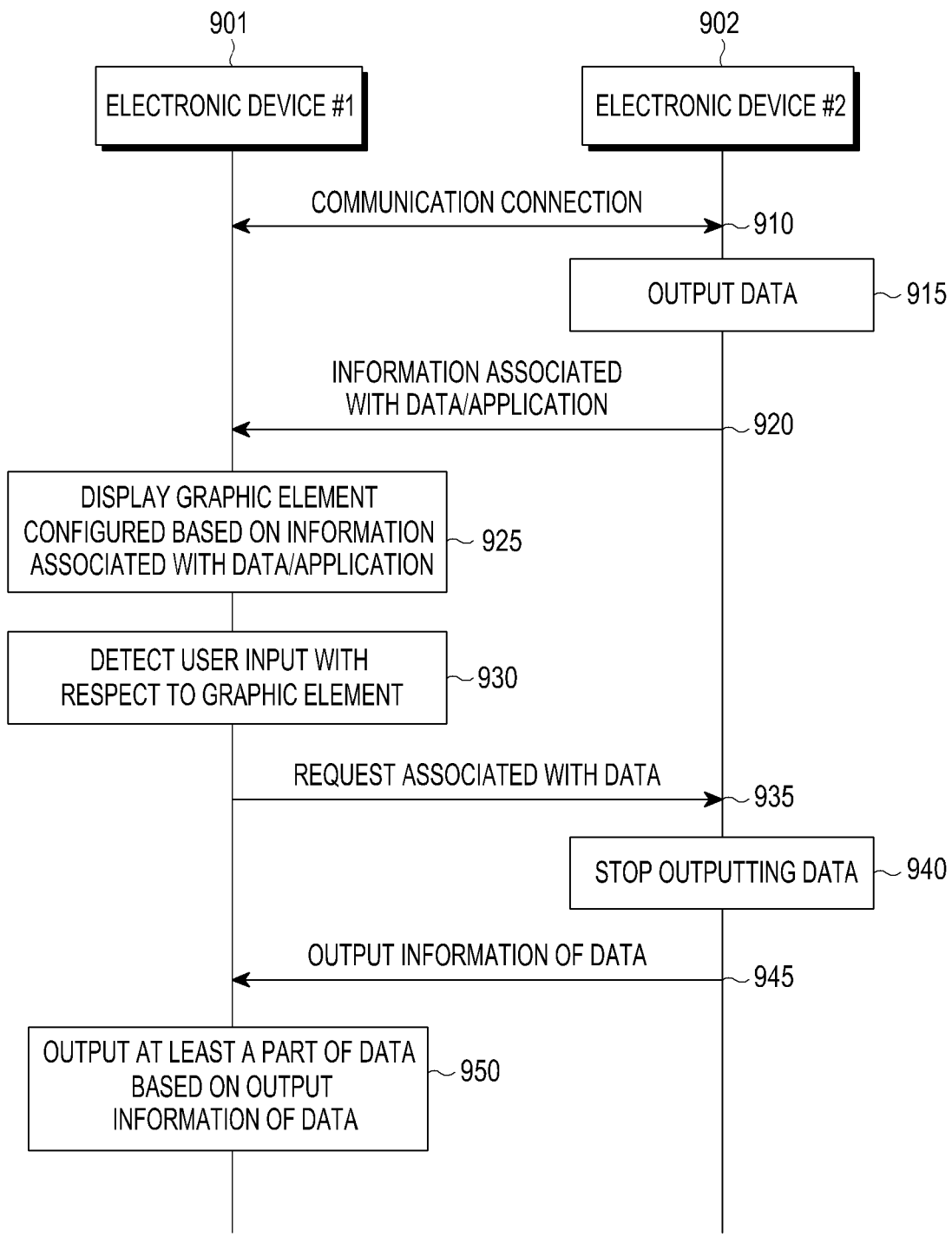
FIG. 9 is a flowchart illustrating an operation method of a first electronic device and a second electronic device according to various embodiments of the present disclosure.

FIG. 9 is a flowchart illustrating an operation method of a first electronic device and a second electronic device according to an embodiment of the present disclosure.

Referring to FIG. 9, an operation method of the first electronic device and the second electronic device may include operations 910 through 950.

The operation method of a first electronic device 901 (e.g., the electronic device 101, 201, or 411) may be performed by at least one of the first electronic device 901, a first processor (e.g., the processor 120, 210, or 412) of the first electronic device 901, and a first controller of the first electronic device 901.

The operation method of a second electronic device 902 (e.g., the electronic device 101, 201, or 421) may be performed by at least one of the second electronic device 902, a second processor (e.g., the processor 120, 210, or 422) of the second electronic device, and a second controller of the second electronic device 902.

In operation 910, the first electronic device 901 and the second electronic device 902 establishes a wired or wireless communication connection. The first electronic device 901 communicates with the second electronic device 902 through a first communication module (e.g., the communication interface 170, the communication module 220 or 417), and the second electronic device 902 communicates with the first electronic device 901 through a second communication module (e.g., the communication interface 170, the communication module 220 or 427).

In operation 915, the second electronic device 902 outputs data through a second output device (e.g., the second output device 426, the I/O interface 150, the display 160 or 260, the speaker 282).

According to an embodiment, operation 910 may be omitted, operation 915 may be performed prior to operation 910, or operation 915 may be sequentially/continuously/accumulatively performed before and after operation 910.

In operation 920, the second electronic device 902 automatically transmits information associated with the data or the application to the first electronic device 901 through the second communication module in response to execution (or activation) of the application for outputting the data, output (or play) of the data, or connection with the first electronic device 901.

According to an embodiment, information associated with the data or the application may include metadata of the data.

According to an embodiment, information associated with the data or the application may include identification information of the data, identification information of the application, a title of the data, a name associated with the data, at least a part of the data, the origin of the data, an address associated with the data, a description of the data, a quantity of the data, a time associated with the data, and/or the like.

According to an embodiment, the data may include at least one of music data, video data, image data, Internet data, document data, message data, mail data, and/or the like.

According to an embodiment, the application may include at least one of a music application, a video application, an image application, an Internet application (or a browser), a document application, a message application, a mail application, and/or the like.

In operation 925, the first electronic device 901 displays a graphic element including at least a part of the information associated with the data or the application on a first output device (e.g., the first output device 416) or a first display (e.g., the display 160 or 260).

According to an embodiment, the graphic element may include at least one of at least one item for indicating at least a part of the information associated with the data or the application, at least one item for controlling output (or play) of the data, and/or the like.

According to an embodiment, the graphic element may include at least one of a text, an image, a file, an icon, an application screen, a GUI such as a dashboard, a panel, a window or the like, a message, and/or the like.

In operation 930, the first electronic device detects a user input with respect to the graphic element through a first input device (e.g., the input device 250) or the first display.

In operation 935, the first electronic device 901 transmits, to the second electronic device 902 through the first communication module in response to the user input, a request associated with the data (e.g., a handover request for an operation related to the data) or a request for transmitting output information of the data. For example, the request may include identification information of the data or identification information of the application.

In operation 940, the second electronic device 902 stops outputting (or playing) the data in response to the request.

In operation 945, the second electronic device 902 transmits output information of the data generated by the second electronic device 902 (or information regarding output of the data by the second electronic device 902) to the first electronic device 901 through the second communication module.

According to an embodiment, the output information of the data may include at least one of at least a part of the data, information regarding a play position, information regarding a play time (or point in time), information regarding the amount of data which has been played, information regarding a remaining time, information regarding the remaining amount to be played, information regarding a stop position, information regarding a stop time (or point in time), information regarding an output position, information regarding an output time (or point in time), information regarding an output order, a relative relationship or order among data elements included in the data, device/application configuration information for output of the data, and/or the like.

In operation 950, the first electronic device 901 outputs at least a part of the data through the first output device based on the output information of the data.

According to an embodiment, the first electronic device 901 receives the data from the second electronic device 902 through the first communication module.

According to an embodiment, the first electronic device 901 sends a message including at least a part of the output information of the data and requesting streaming of the data to the second electronic device 902 or a third electronic device through the first communication module. The first electronic device 901 outputs the data streamed from the second electronic device 902 or the third electronic device 903 through the first output device.

Figure 10:
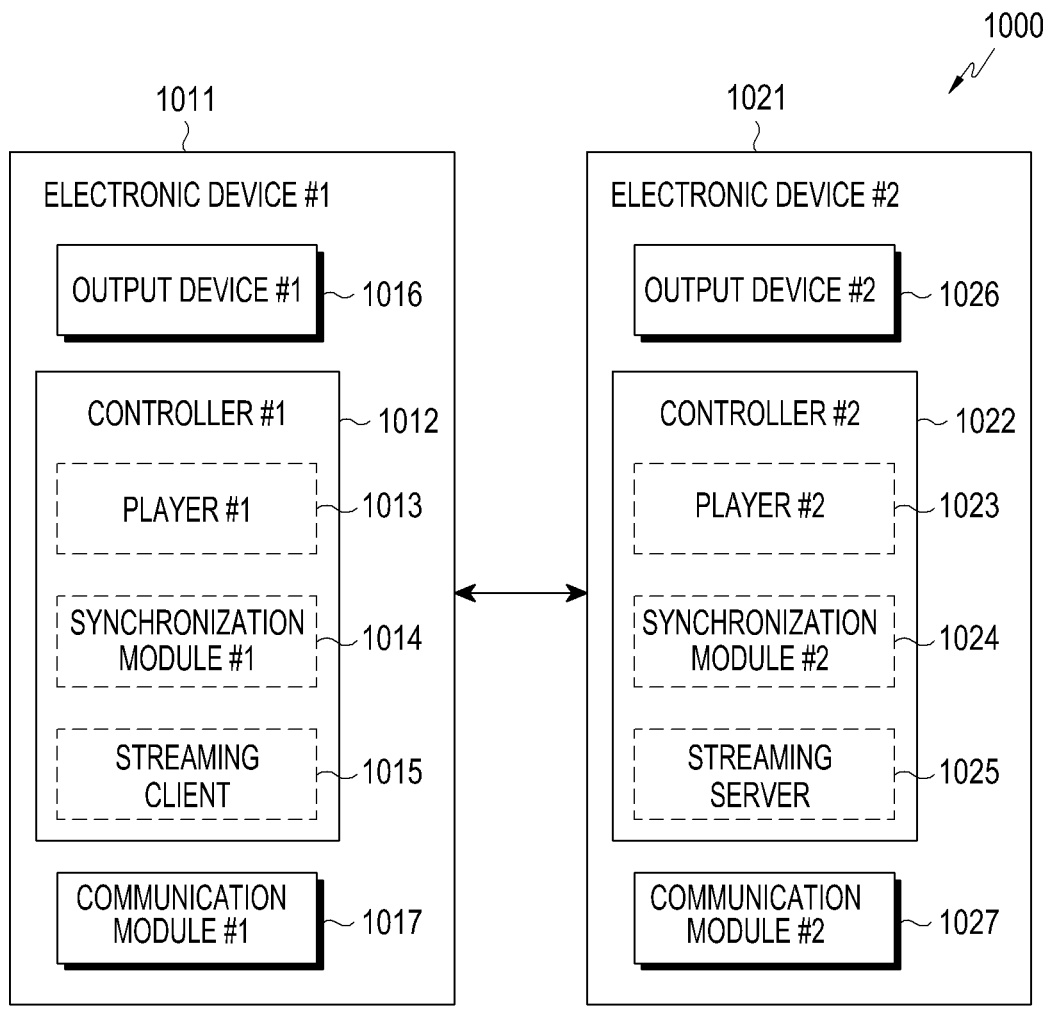
FIG. 10 is a diagram for describing a communication system according to various embodiments of the present disclosure.

FIG. 10 is a diagram for describing a communication system according to various embodiments of the present disclosure.

Referring to FIG. 10, a communication system 1000 may include a first electronic device 1011 (e.g., the electronic device 101 or 201) and a second electronic device 1021 (e.g., the electronic device 101 or 201).

The first electronic device 1011 may include a first output device 1016 (e.g., the I/O interface 150, the display 160 or 260, the speaker 282) for outputting data, a first communication module 1017 (e.g., the communication interface 170 or the communication module 220) for transmitting data, data/application-associated information, or data output information to an external electronic device or receiving data, data/application-associated information, or data output information from the external electronic device, and a first processor 1012 (e.g., the processor 120 or 210) for implementing a function of the first electronic device 1011 by controlling the first output device 1016 and/or the first communication module 1017.

The second electronic device 1021 may include a first output device 1026 (e.g., the I/O interface 150, the display 160 or 260, the speaker 282) for outputting data, a second communication module 1027 (e.g., the communication interface 170 or the communication module 220) for transmitting data, data/application-associated information, or data output information to an external electronic device or receiving data, data/application-associated information, or data output information from the external electronic device, and a second processor 1022 (e.g., the processor 120 or 210) for implementing a function of the second electronic device 1021 by controlling the second output device 1026 and/or the second communication module 1027.

A second player 1023 of the second electronic device 1021 outputs data through the second output device 1026.

The second controller 1022 of the second electronic device 1021 automatically transmits information associated with the data or the second player 1023 to the first electronic device 1011 through the second communication module 1027 in response to execution (or activation) of the second player 1023, output (or play) of the data, or connection with the first electronic device 1011.

The first controller 1012 of the first electronic device 1011 displays a graphic element including at least a part of the information associated with the data or the second player 1023 on the first output device 1016.

The first controller 1012 of the first electronic device 1011 detects a user input with respect to the graphic element through a first input device (e.g., the input device 250).

The first electronic device 1011 transmits, to the second electronic device 1021 through the first communication module 1017, a request associated with the data (e.g., a handover request for an operation related to the data) or a request for transmitting output information of the data in response to the user input.

The second player 1023 of the second electronic device 1021 stops outputting (or playing) the data in response to the request.

A second synchronization module 1024 of the second electronic device 1021 transmits output information of the data (or information regarding output of the data by the second electronic device 1021) to the first electronic device 1011 through the second communication module 1027. The output information of the data may include address information of the data (e.g., a uniform resource locator (URL)) and synchronization information of the data (e.g., information regarding a play position/a play time (or point in time)). For example, the address information (e.g., the URL) may correspond to a position of the data (or file) stored in a second memory (e.g., the memory 130 or 230) of the second electronic device 1021.

A first synchronization module 1014 of the first electronic device 1011 delivers the synchronization information and address information of the data received from the second electronic device 1021 to a streaming client 1015 of the first electronic device 1011.

The streaming client 1015 sends a streaming request message including at least a part of the address information and the synchronization information to the second electronic device 1021 through the first communication module 1017.

A streaming server 1025 of the second electronic device 1021 streams a part of the data corresponding to the address information, which follows an output stop point in time (i.e., a stop point in time in the second electronic device 1021), to the first electronic device 1011 through socket communication using the second communication module 1027, in response to the streaming request message received through the second communication module 1027.

A first player 1013 of the first electronic device 1011 outputs data streamed from the streaming server 1025 through the first output device 1016.

Figure 11:
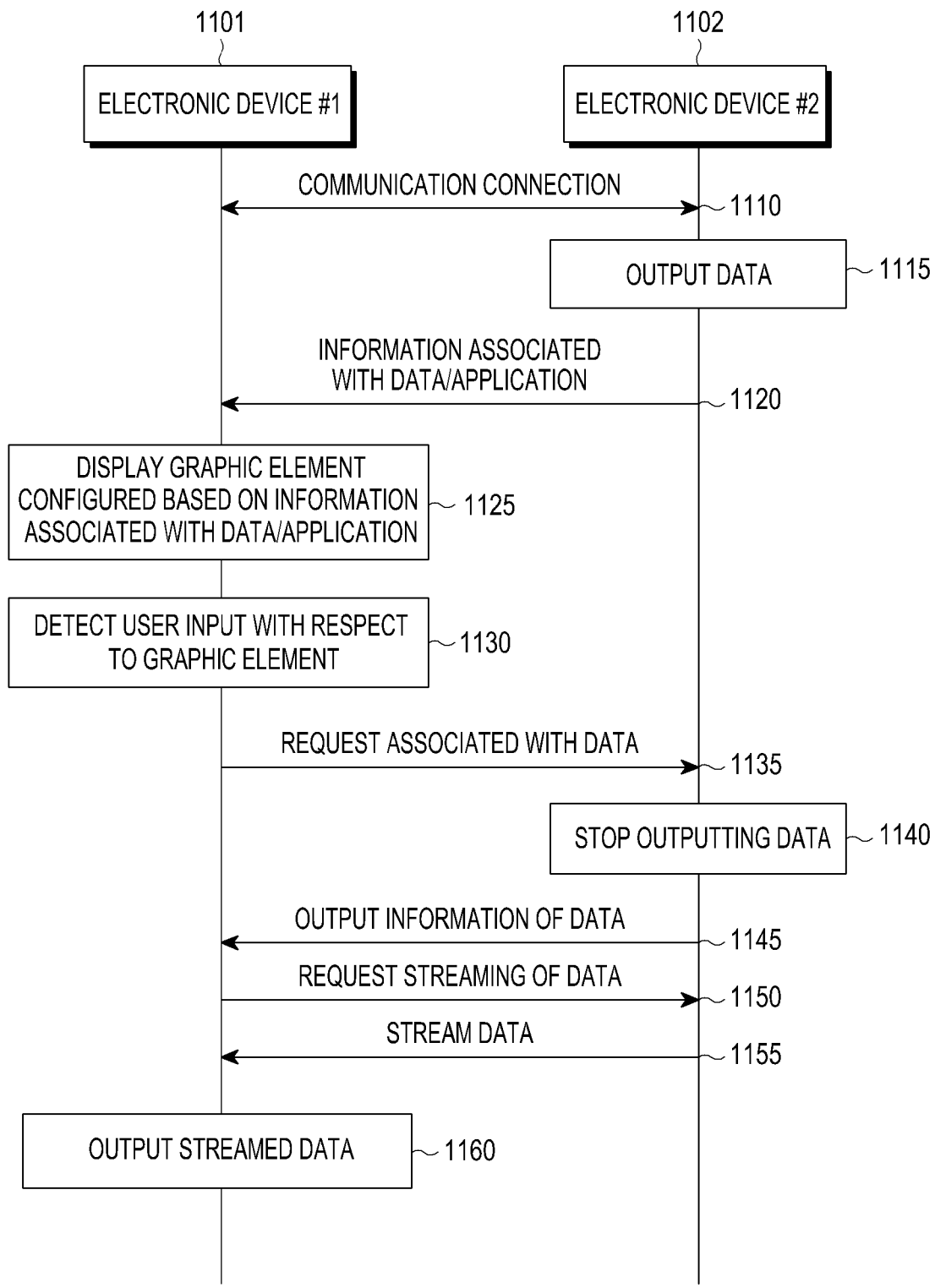
FIG. 11 is a flowchart illustrating an operation method of a first electronic device and a second electronic device according to various embodiments of the present disclosure.

FIG. 11 is a flowchart illustrating an operation method of a first electronic device and a second electronic device according to various embodiments of the present disclosure.

Referring to FIG. 11, an operation method of the first electronic device and the second electronic device may include operations 1110 through 1160.

The operation method of a first electronic device 1101 (e.g., the electronic device 101, 201, or 411) may be performed by at least one of the first electronic device 1101, a first processor (e.g., the processor 120, 210, or 412) of the first electronic device 1101, and a first controller (e.g., the first controller 1012) of the first electronic device 1101.

The operation method of the second electronic device 1102 (e.g., the electronic device 101, 201, or 421) may be performed by at least one of the second electronic device 1102, a second processor (e.g., the processor 120, 210, or 422) of the second electronic device 1102, and a second controller (e.g., the second controller 1022) of the second electronic device 1102.

In operation 1110, the first electronic device 1101 and the second electronic device 1102 establishes a wired or wireless communication connection. The first electronic device 1101 communicates with the second electronic device 1102 through a first communication module (e.g., the communication interface 170, the communication module 220 or 417), and the second electronic device 1102 communicates with the first electronic device 1101 through a second communication module (e.g., the communication interface 170, the communication module 220 or 427).

In operation 1115, the second electronic device 1102 outputs data (e.g., audio/video data) through a second output device (e.g., the second output device 426, the I/O interface 150, the display 160 or 260, the speaker 282).

According to an embodiment, operation 1110 may be omitted, operation 1115 may be performed prior to operation 1110, or operation 1115 may be sequentially/continuously/accumulatively performed before and after operation 1110.

In operation 1120, the second electronic device 1102 automatically transmits information associated with the data or the application to the first electronic device 1101 through the second communication module in response to execution (or activation) of the application for outputting the data, output (or play) of the data, or connection with the first electronic device 1101.

According to an embodiment, information associated with the data or the application may include metadata of the data.

According to an embodiment, information associated with the data or the application may include identification information of the data, identification information of the application, a title of the data, a name associated with the data, at least a part of the data, the origin of the data, an address associated with the data, a description of the data, a quantity of the data, a time associated with the data, and/or the like.

According to an embodiment, the data may include music data or video data.

According to an embodiment, the application may include a music application or a video application.

In operation 1125, the first electronic device 1101 displays a graphic element including at least a part of the information associated with the data or the application on a first output device (e.g., the first output device 416) or a first display (e.g., the display 160 or 260).

According to an embodiment, the graphic element may include at least one of at least one item for indicating at least a part of the information associated with the data or the application, at least one item for controlling output (or play) of the data, and/or the like.

According to an embodiment, the graphic element may include at least one of a text, an image, a file, an icon, an application screen, a GUI such as a dashboard, a panel, a window or the like, a message, and/or the like.

In operation 1130, the first electronic device 1101 detects a user input with respect to the graphic element through a first input device (e.g., the input device 250) or the first display.

In operation 1135, the first electronic device 1101 transmits, to the second electronic device 1102 through the first communication module, a request associated with the data (e.g., a handover request for an operation related to the data) or a request for transmitting output information of the data in response to the user input. For example, the request may include identification information of the data or identification information of the application.

In operation 1140, the second electronic device 1102 stops outputting (or playing) the data in response to the request.

In operation 1145, the second electronic device 1102 transmits output information of the data generated by the second electronic device 1102 (or information regarding output of the data by the second electronic device 1102) to the first electronic device 1101 through the second communication module. The output information of the data may include address information of the data (e.g., a URL) and synchronization information of the data (e.g., information regarding a play position/a play time (or point in time)). For example, the address information (e.g., the URL) may correspond to a position of the data (or file) stored in a second memory (e.g., the memory 130 or 230) of the second electronic device 1102.

In operation 1150, the first electronic device 1101 sends a streaming request message including at least a part of the address information and the synchronization information to the second electronic device 1102 through the first communication module based on the output information of the data.

In operation 1155, the second electronic device 1102 streams a part of the data corresponding to the address information, which follows an output stop point in time (i.e., a stop point in time in the second electronic device 1102), to the first electronic device 1101 through the second communication module, in response to the streaming request message received through the second communication module.

In operation 1160, the first electronic device 1101 outputs the data streamed from the second electronic device 1102 through the first output device.

Figure 12:
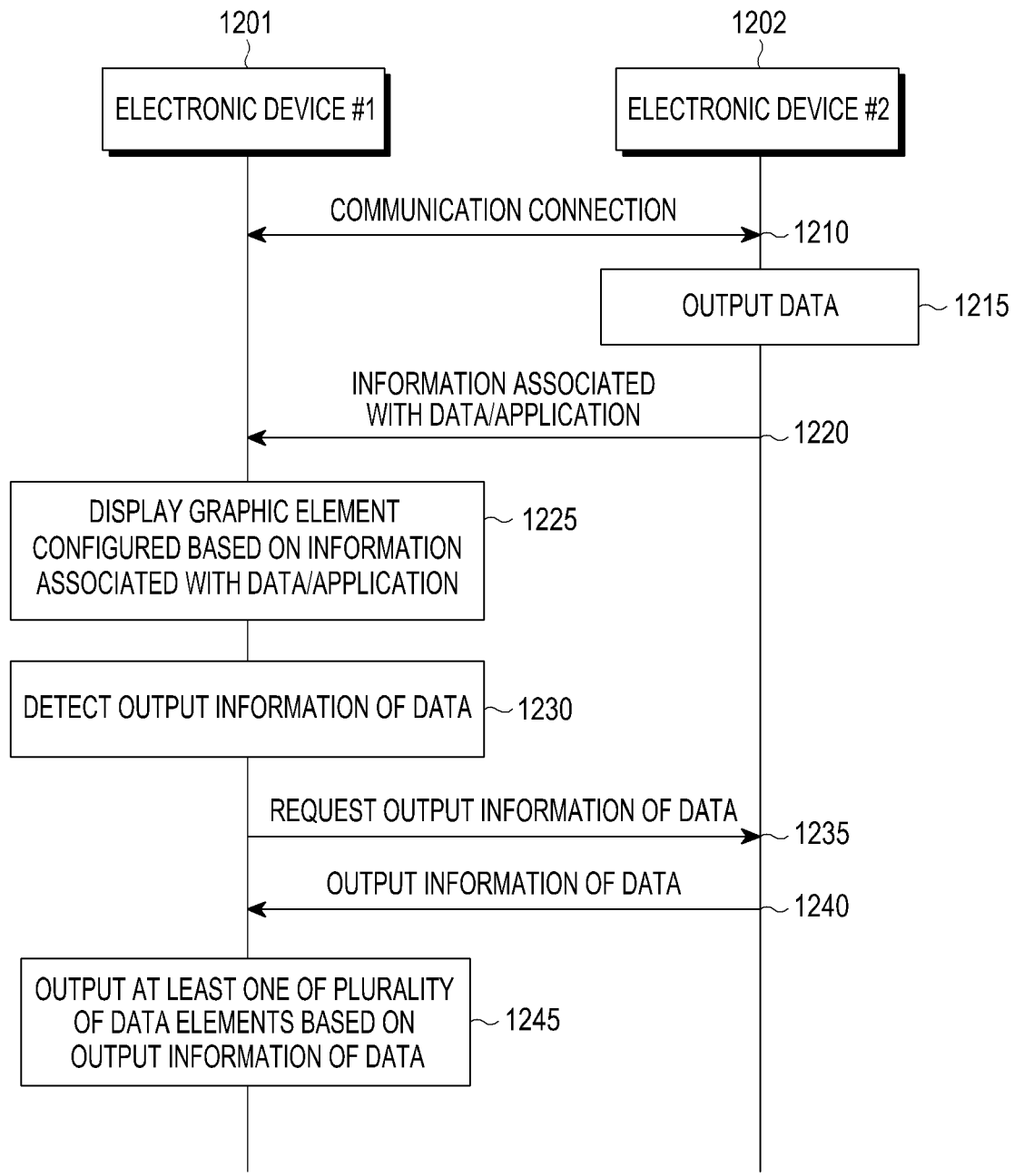
FIG. 12 is a flowchart illustrating an operation method of a first electronic device and a second electronic device according to various embodiments of the present disclosure.

FIG. 12 is a flowchart illustrating an operation method of a first electronic device and a second electronic device according to various embodiments of the present disclosure.

Referring to FIG. 12, an operation method of the first electronic device and the second electronic device may include operations 1210 through 1245.

The operation method of a first electronic device 1201 (e.g., the electronic device 101, 201, or 411) may be performed by at least one of the first electronic device 1201, a first processor (e.g., the processor 120, 210, or 412) of the first electronic device 1201, and a first controller (e.g., the first controller 1012) of the first electronic device 1201.

The operation method of the second electronic device 1202 (e.g., the electronic device 101, 201, or 421) may be performed by at least one of the second electronic device 1202, a second processor (e.g., the processor 120, 210, or 422) of the second electronic device 1202, and a second controller (e.g., the second controller 1022) of the second electronic device 1202.

In operation 1210, the first electronic device 1201 and the second electronic device 1202 establishes a wired or wireless communication connection. The first electronic device 1201 communicates with the second electronic device 1202 through a first communication module (e.g., the communication interface 170, the communication module 220 or 417), and the second electronic device 1202 communicates with the first electronic device 1201 through a second communication module (e.g., the communication interface 170, the communication module 220 or 427).

In operation 1215, the second electronic device 1202 outputs (or displays) data on a second display (e.g., the display 160 or 260, the second output device 426).

According to an embodiment, operation 1210 may be omitted, operation 1215 may be performed prior to operation 1210, or operation 1215 may be sequentially/continuously/accumulatively performed before and after operation 1210.

In operation 1220, the second electronic device 1202 automatically transmits information associated with the data or the application to the first electronic device 1201 through the second communication module in response to execution (or activation) of the application for outputting the data, output (or play) of the data, or connection with the first electronic device 1201.

According to an embodiment, information associated with the data or the application may include metadata of the data.

According to an embodiment, information associated with the data or the application may include identification information of the data, identification information of the application, a title of the data, a name associated with the data, at least a part of the data, the origin of the data, an address associated with the data, a description of the data, a quantity of the data, a time associated with the data, and/or the like.

According to an embodiment, the data may include at least one of music data, video data, image data, Internet data, document data, message data, mail data, and/or the like.

According to an embodiment, the application may include at least one of a music application, a video application, an image application, an Internet application (or a browser), a document application, a message application, a mail application, and/or the like.

In operation 1225, the first electronic device 1201 displays a graphic element including at least a part of the information associated with the data or the application on a first display (e.g., the display 160 or 260, the first output device 416).

According to an embodiment, the graphic element may include at least one of at least one item (e.g., an Internet address (or a web address)) for indicating at least a part of the information associated with the data or the application, at least one item for controlling output (or play) of the data, and/or the like.

According to an embodiment, the graphic element may include at least one of a text, an image, a file, an icon, an application screen, a GUI such as a dashboard, a panel, a window or the like, a message, and/or the like.

In operation 1230, the first electronic device 1201 detects a user input with respect to the graphic element through a first input device (e.g., the input device 250) or the first display.

In operation 1235, the first electronic device 1201 transmits, to the second electronic device 1202 through the first communication module, a request associated with the data (e.g., a handover request for an operation related to the data (e.g., an Internet operation)) or a request for transmitting output information of the data in response to the user input. For example, the request may include identification information of the data or identification information of the application.

In operation 1240, the second electronic device 1202 transmits output information of the data generated by the second electronic device 1202 (or information regarding output of the data by the second electronic device 1202) to the first electronic device 1201 through the second communication module in response to the request.

According to an embodiment, the output information of the data may include at least one of information regarding an address corresponding to a data-stored position (e.g., an Internet address or a web address), information about an Internet search history, favorites information, information regarding a relative relationship or order among data elements, device/application configuration information for outputting data, and/or the like.

According to an embodiment, the output information of the data may include at least one of at least a part of the data, information regarding a play position, information regarding a play time (or point in time), information regarding the amount of data which has been played, information regarding a remaining time, information regarding the remaining amount to be played, information regarding a stop position, information regarding a stop time (or point in time), information regarding an output position, information regarding an output time (or point in time), information regarding an output order, a relative relationship or order among data elements included in the data, device/application configuration information for output of the data, and/or the like.

In operation 1245, the first electronic device 1201 outputs at least one of a plurality of data elements (e.g., Internet data, web pages, etc.) included in the data through the first display based on the output information of the data.

According to an embodiment, the first electronic device 1201 receives the data from the second electronic device 1202 through the first communication module.

According to an embodiment, the first electronic device 1201 outputs one (e.g., the latest data element) of the plurality of data elements through the first display. The first electronic device 1201 outputs another one of the plurality of data elements in response to a user input.

Figure 13:
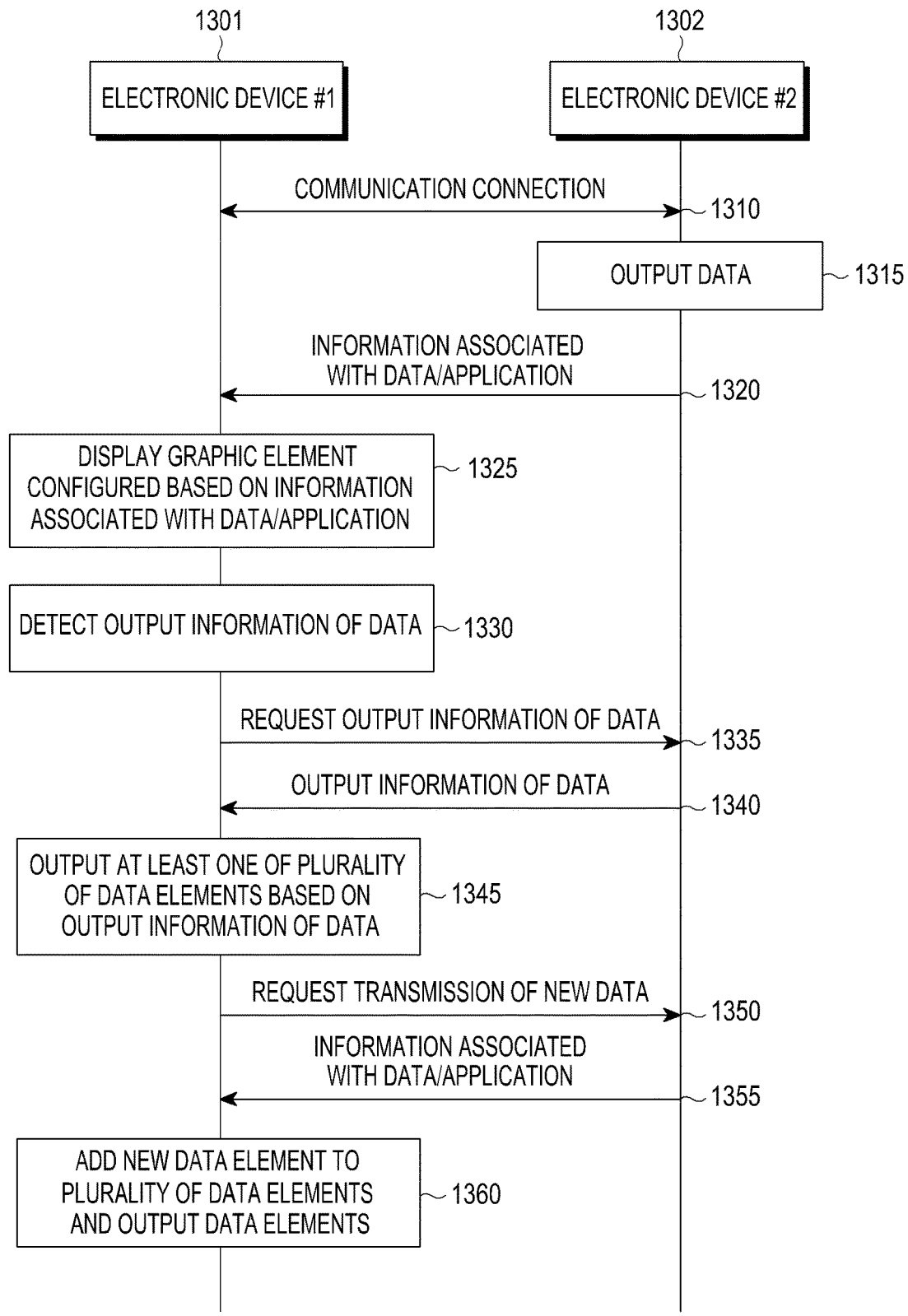
FIG. 13 is a flowchart illustrating an operation method of a first electronic device and a second electronic device according to various embodiments of the present disclosure.

FIG. 13 is a flowchart illustrating an operation method of a first electronic device and a second electronic device according to various embodiments of the present disclosure.

Referring to FIG. 13, an operation method of the first electronic device and the second electronic device may include operations 1310 through 1360.

The operation method of a first electronic device 1301 (e.g., the electronic device 101, 201, or 411) may be performed by at least one of the first electronic device 1301, a first processor (e.g., the processor 120, 210, or 412) of the first electronic device 1301, and a first controller (e.g., the first controller 1012) of the first electronic device 1301.

The operation method of the second electronic device 1302 (e.g., the electronic device 101, 201, or 421) may be performed by at least one of the second electronic device 1302, a second processor (e.g., the processor 120, 210, or 422) of the second electronic device 1302, and a second controller (e.g., the second controller 1022) of the second electronic device 1302.

In operation 1310, the first electronic device 1301 and the second electronic device 1302 establishes a wired or wireless communication connection. The first electronic device 1301 communicates with the second electronic device 1302 through a first communication module (e.g., the communication interface 170, the communication module 220 or 417), and the second electronic device 1302 communicates with the first electronic device 1301 through a second communication module (e.g., the communication interface 170, the communication module 220 or 427).

In operation 1315, the second electronic device 1302 outputs (or displays) data on a second display (e.g., the display 160 or 260, the second output device 426).

According to an embodiment, operation 1310 may be omitted, operation 1315 may be performed prior to operation 1310, or operation 1315 may be sequentially/continuously/accumulatively performed before and after operation 1310.

In operation 1320, the second electronic device 1302 automatically transmits information associated with the data or the application to the first electronic device 1301 through the second communication module in response to execution (or activation) of the application for outputting the data, output (or play) of the data, or connection with the first electronic device 1301.

According to an embodiment, information associated with the data or the application may include metadata of the data.

According to an embodiment, information associated with the data or the application may include identification information of the data, identification information of the application, a title of the data, a name associated with the data, at least a part of the data, the origin of the data, an address associated with the data, a description of the data, a quantity of the data, a time associated with the data, and/or the like.

According to an embodiment, the data may include message data in which a message (or a message data element) of a user of the second electronic device 1302 and a message (or a message data element) of a counterpart received from a third electronic device (e.g., the third electronic device 431) communicating with the second electronic device 1302 are chronologically arranged.

According to an embodiment, the data may include at least one of music data, video data, image data, Internet data, document data, message data, mail data, and/or the like.

According to an embodiment, the application may include at least one of a music application, a video application, an image application, an Internet application (or a browser), a document application, a message application, a mail application, and/or the like.

In operation 1325, the first electronic device 1301 displays a graphic element including at least a part of the information associated with the data or the application on a first display (e.g., the display 160 or 260, the first output device 416).

According to an embodiment, the graphic element may include at least one item (e.g., a recently output (or received/sent) message) for displaying at least a part of the information associated with the data or the application.

According to an embodiment, the graphic element may include at least one of a text, an image, a file, an icon, an application screen, a GUI such as a dashboard, a panel, a window or the like, a message, and/or the like.

In operation 1330, the first electronic device 1301 detects a user input with respect to the graphic element through a first input device (e.g., the input device 250) or the first display.

In operation 1335, the first electronic device 1301 transmits, to the second electronic device 1302 through the first communication module, a request associated with the data (e.g., a handover request for an operation related to the data (e.g., a message operation)) or a request for transmitting output information of the data in response to the user input. For example, the request may include identification information of the data or identification information of the application.

In operation 1340, the second electronic device 1302 transmits output information of the data generated by the second electronic device 1302 (or information regarding output of the data by the second electronic device 1302) to the first electronic device 1301 through the second communication module in response to the request.

According to an embodiment, the output information of the data may include at least one of identification information regarding a message recipient/sender, messages, information regarding a relative relationship or order among messages, device/application configuration information for outputting message data, and/or the like.

According to an embodiment, the output information of the data may include at least one of at least a part of the data, information regarding a play position, information regarding a play time (or point in time), information regarding the amount of data which has been played, information regarding a remaining time, information regarding the remaining amount to be played, information regarding a stop position, information regarding a stop time (or point in time), information regarding an output position, information regarding an output time (or point in time), information regarding an output order, a relative relationship or order among data elements included in the data, device/application configuration information for output of the data, and/or the like.

In operation 1345, the first electronic device 1301 outputs at least one of a plurality of data elements (e.g., messages) included in the data arranged based on the output information of the data through the first display.

According to an embodiment, the first electronic device 1301 receives the data from the second electronic device 1302 through the first communication module.

In operation 1350, the first electronic device 1301 sends a transmission request message including new data/data element (e.g., a newly sent message) to the second electronic device 1302 through the first communication module in response to the user input.

The second electronic device 1302 sends new data received from the first electronic device 1301 to the third electronic device through the second communication module and the network (e.g., the network 162).

In operation 1355, the second electronic device 1302 automatically transmits information associated with the data or the application to the first electronic device 1301 through the second communication module in response to output (or transmission) of the new data (or a message or message data).

In operation 1360, the first electronic device 1301 adds the new data/data element to the plurality of data elements and displays them through the first display.

According to various embodiments, an operation method of a first electronic device includes receiving information associated with data or an application for outputting the data from a second electronic device, displaying a graphic element including at least a part of the information associated with the data or the application, detecting a user input with respect to the graphic element, and outputting at least a part of the data based on the output information of the data in response to the user input.

According to various embodiments, information associated with the data or the application may include metadata of the data.

According to various embodiments, the information associated with the data or the application may include at least one of identification information of the data, identification information of the application, a title of the data, a name associated with the data, at least a part of the data, the origin of the data, an address associated with the data, a description of the data, a quantity of the data, a time associated with the data, and/or the like.

According to various embodiments, the data may include at least one of music data, video data, image data, Internet data, document data, message data, mail data, and/or the like.

According to various embodiments, the application may include at least one of a music application, a video application, an image application, an Internet application (or a browser), a document application, a message application, a mail application, and/or the like.

According to various embodiments, the graphic element may include at least one of a text, an image, a file, an icon, an application screen, a GUI such as a dashboard, a panel, a window or the like, a message, and/or the like.

According to various embodiments, the output information of the data may include at least one of at least a part of the data, information regarding a play position, information regarding a play time, information regarding the amount of data has been played, information regarding a remaining time, information regarding the remaining amount to be played, information regarding a stop position, information regarding a stop time, information regarding an output position, information regarding an output time, information regarding an output order, a relative relationship or order among data elements included in the data, device configuration information for output of the data, and/or the like.

According to various embodiments, the operation method may further include receiving output information of the data from the second electronic device.

According to various embodiments, the outputting of the at least a part of the data may include receiving the data from the second electronic device and outputting a part of the data, which follows an output stop point in time, based on output information of the data.

According to various embodiments, the outputting of the at least a part of the data may include requesting the second electronic device or a third electronic device to stream the part of the data, which follows an output stop point in time, based on output information of the data and outputting a part of the data streamed from the second electronic device or the third electronic device, which follows the output stop point in time.

According to various embodiments, the outputting of the at least a part of the data may include sending a message including at least a part of output information of the data and requesting streaming of the part of the data to the second electronic device or a third electronic device and outputting the data streamed from the second electronic device or the third electronic device.

According to various embodiments, the operation method may further include transmitting output information of the data by the first electronic device to the second electronic device.

According to various embodiments, the operation method may further include receiving a request for output information of the data from the second electronic device and transmitting the output information of the data to the second electronic device in response to the request.

According to various embodiments, the outputting of the at least a part of the data may include outputting a first data element of the data and displaying a graphic element corresponding to a second data element of the data associated with the first data element based on output information of the data.

According to various embodiments, the outputting of the at least a part of the data may include receiving the data from the second electronic device and chronologically arranging data elements of the data and displaying the arranged data elements based on output information of the data.

According to various embodiments, the operation method may further include generating a message associated with the data and sending the message to the second electronic device.

According to various embodiments, the operation method may further include generating a message associated with the data, sending the message to the second electronic device, and receiving output information of the message from the second electronic device.

According to various embodiments, the outputting of the at least a part of the data may include changing device settings of the first electronic device based on output information of the data and outputting the at least a part of the data based on the changed device settings.

According to various embodiments, a first electronic device includes an output device and a processor configured to receive information associated with data or an application for outputting the data from a second electronic device, to display a graphic element including at least a part of the information associated with the data or the application on the output device, to detect a user input with respect to the graphic element, and to output at least a part of the data through the output device based on output information of the data in response to the user input.

According to various embodiments, the processor is further configured to receive output information of the data from the second electronic device.

According to various embodiments, the processor is further configured to receive the data from the second electronic device and to output a part of the data, which follows an output stop point in time, through the output device based on output information of the data.

According to various embodiments, the processor is further configured to request the second electronic device or a third electronic device to stream the part of the data, which follows an output stop point in time, based on output information of the data and to output a part of the data streamed from the second electronic device or the third electronic device, which follows the output stop point in time, through the output device.

According to various embodiments, the processor may be further configured to send a message including at least a part of output information of the data and requesting streaming of the part of the data to the second electronic device or a third electronic device and to output the data streamed from the second electronic device or the third electronic device.

According to various embodiments, the processor may be further configured to transmit output information of the data by the first electronic device to the second electronic device.

According to various embodiments, the processor may be further configured to receive a request for output information of the data from the second electronic device and to transmit the output information of the data to the second electronic device in response to the request.

According to various embodiments, the processor may be further configured to output a first data element of the data through the output device and to display a graphic element corresponding to a second data element of the data associated with the first data element on the output device based on output information of the data.

According to various embodiments, the processor may be further configured to receive the data from the second electronic device and to chronologically arrange data elements of the data and display the arranged data elements on the output device based on output information of the data.

According to various embodiments, the processor may be further configured to generate a message associated with the data and to send the message to the second electronic device.

According to various embodiments, the processor may be further configured to generate a message associated with the data, to send the message to the second electronic device, and to receive output information of the message from the second electronic device.

According to various embodiments, the processor may be further configured to change device settings of the first electronic device based on output information of the data and to output the at least a part of the data based on the changed device settings.

According to various embodiments, a method for easily delivering a task being in progress on an electronic device to another electronic device is provided.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific IC (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, magnetic media (e.g., a magnetic tape), optical media (e.g., compact disc ROM (CD-ROM) or digital versatile disc (DVD), magneto-optical media (e.g., floptical disk), a hardware device (e.g., ROM, RAM, flash memory, etc.), and/or the like. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium having stored therein commands is provided, in which the commands are set, when executed by at least one processor, to cause the at least one processor to perform at least one operation, the at least one operation including receiving information associated with data or an application for outputting the data from a second electronic device, displaying a graphic element including at least a part of the information associated with the data or the application, detecting a user input with respect to the graphic element, and outputting at least a part of the data based on the output information of the data in response to the user input.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a first electronic device, the method comprising:
   receiving meta data of data or meta data of an application for outputting the data from a second electronic device in response to execution of the data or the application by the second electronic device;
   displaying a graphic element comprising at least a part of the meta data of the data or the meta data of the application for outputting the data for remotely controlling the second electronic device;
   detecting a user input with respect to the graphic element;

sending a request to the second electronic device for transmitting output information of the data in response to the user input;

receiving from the second electronic device the output information of the data in response to the request for transmitting the output information; and outputting at least a part of the data based on output information of the data in response to receiving the output information, wherein the outputting of the at least the part of the data comprises:

requesting the second electronic device to stream the part of the data based on the output information of the data, which follows a point in time where the second electronic device stops outputting the data in response to the request for transmitting the output information sent from the first electronic device, and outputting the at least the part of the data streamed from the second electronic device, which follows the point in time where the second electronic device stops outputting the data.

2. The method of claim 1, wherein the outputting of the at least the part of the data comprises:

outputting a first data element of the data; and displaying a graphic element corresponding to a second data element of the data associated with the first data element based on the output information of the data.

3. The method of claim 1, wherein the outputting of the at least the part of the data comprises:

receiving the data from the second electronic device; and chronologically arranging data elements of the data and displaying the arranged data elements based on the output information of the data.

4. A non-transitory machine-readable storage medium having recorded thereon instructions that when executed by a first electronic device cause the first electronic device to perform:

receiving meta data of data or meta data of an application for outputting the data from a second electronic device in response to execution of the data or the application by the second electronic device;

displaying a graphic element comprising at least a part of the meta data of the data or the meta data of the application for outputting the data;

detecting a user input with respect to the graphic element;

sending a request to the second electronic device for transmitting output information of the data in response to the user input;

receiving from the second electronic device the output information of the data in response to the request for transmitting the output information; and outputting at least a part of the data based on output information of the data in response to receiving the output information, wherein the outputting of the at least the part of the data comprises:

requesting the second electronic device to stream the part of the data based on the output information of the data, which follows a point in time where the second electronic device stops outputting the data in response to the request for transmitting the output information sent from the first electronic device, and outputting the at least the part of the data streamed from the second electronic device, which follows the point in time where the second electronic device stops outputting the data.

5. The non-transitory machine-readable storage medium of claim 4, wherein the outputting of the at least the part of the data comprises:

outputting a first data element of the data; and displaying a graphic element corresponding to a second data element of the data associated with the first data element based on the output information of the data.

6. The non-transitory machine-readable storage medium of claim 4, wherein the outputting of the at least the part of the data comprises:

receiving the data from the second electronic device; and chronologically arranging data elements of the data and displaying the arranged data elements based on the output information of the data.

7. The non-transitory machine-readable storage medium of claim 4, wherein the outputting of the at least the part of the data comprises:

changing device settings of the first electronic device based on the output information of the data; and outputting at least a part of the data based on the changed device settings.

8. A first electronic device comprising:

an output device; and a processor configured to:

receive meta data of data or meta data of an application for outputting the data from a second electronic device in response to execution of the data or the application by the second electronic device, display a graphic element comprising at least a part of the meta data of the data or the meta data of the application on the output device for remotely controlling the second electronic device, detect a user input with respect to the graphic element, send a request to the second electronic device for transmitting output information of the data in response to the user input, receive from the second electronic device the output information of the data in response to the request for transmitting the output information, and output at least a part of the data through the output device based on output information of the data in response to receiving the output information, wherein the outputting of the at least the part of the data comprises:

request the second electronic device to stream the part of the data based on the output information of the data, which follows a point in time where the second electronic device stops outputting the data in response to the request for transmitting the output information sent from the first electronic device, and output the at least the part of the data streamed from the second electronic device, which follows the point in time where the second electronic device stops outputting the data.

9. The first electronic device of claim 8, wherein the output information of the data comprises at least one of information regarding a play position, information regarding a play time, information regarding an amount of data has been played, information regarding a remaining time, information regarding a remaining amount to be played, information regarding a stop position, information regarding a stop time, information regarding an output position, information regarding an output time, information regarding an output order, a relative relationship or order among data elements included in the data, or device configuration information for output of the data.

10. The first electronic device of claim 8, wherein the processor is further configured to:
- output a first data element of the data, and
- display a graphic element corresponding to a second data element of the data associated with the first data element on the output device based on the output information of the data.

11. The first electronic device of claim 8, wherein the processor is further configured to:
- receive the output information of the data from the second electronic device, and
- chronologically arrange data elements of the data and display the arranged data elements on the output device based on the output information of the data.

12. The first electronic device of claim 8, wherein the processor is further configured to:
- generate a message associated with the data, and
- send the message to the second electronic device.

13. The first electronic device of claim 8, wherein the processor is further configured to:
- change device settings of the first electronic device based on the output information of the data, and
- output at least a part of the data based on the changed device settings.

* * * * *